US006563491B1

(12) United States Patent
Omura

(10) Patent No.: US 6,563,491 B1
(45) Date of Patent: May 13, 2003

(54) COORDINATE INPUT APPARATUS AND THE RECORDING MEDIUM THEREOF

(75) Inventor: Katsuyuki Omura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 205 days.

(21) Appl. No.: 09/659,822

(22) Filed: Sep. 11, 2000

(30) Foreign Application Priority Data

Sep. 10, 1999 (JP) ............................................. 11-258075

(51) Int. Cl.$^7$ ................................................. G09G 5/00
(52) U.S. Cl. ........................ 345/173; 345/174; 345/175; 345/176; 345/177; 345/178; 345/179; 178/18.01; 178/19.01
(58) Field of Search ................................. 345/173, 178, 345/174, 175, 176, 177; 178/18.1, 18.01, 19.01

(56) References Cited

U.S. PATENT DOCUMENTS

| 5,161,113 | A | 11/1992 | Omura |
| 5,208,874 | A | 5/1993 | Omura |
| 5,218,558 | A | 6/1993 | Omura |
| 6,229,529 | B1 * | 5/2001 | Yano et al. ............... 178/18.04 |
| 6,335,724 | B1 * | 1/2002 | Takekawa et al. .......... 345/173 |
| 6,411,285 | B1 * | 6/2002 | Miyazawa ................. 345/173 |
| 6,429,856 | B1 | 8/2002 | Omura et al. |

FOREIGN PATENT DOCUMENTS

| JP | 3-244017 | 10/1991 |
| JP | 9-091094 | 4/1997 |
| JP | 2896183 | 3/1999 |

* cited by examiner

Primary Examiner—Richard Hjerpe
Assistant Examiner—Ali Zamani
(74) Attorney, Agent, or Firm—Oblon, Spivak, McClelland, Maier & Neustadt, P.C.

(57) ABSTRACT

An apparatus that includes angle detection sections periodically detecting a point on a panel as angles. An angle storing section stores the angles detected during an immediately earlier Ucycle among angles periodically detected, and an angle choosing section chooses angles which are most adjacent to the angles stored among angles detected during the immediately earlier cycle when a number of angles detected during a present cycle is greater than a number of angles detected during the immediately earlier cycle. A coordinate arithmetic section detects during the immediately earlier cycle coordinates based on the angles chosen. In this apparatus, when the number of angles detected during the present cycle is one greater than the number of angles detected during the immediately earlier cycle for each angle detecting section, the coordinates inputted by an other pointing device can be detected through angles which have not been chosen.

16 Claims, 18 Drawing Sheets

COORDINATE INPUT APPARATUS AND THE RECORDING MEDIUM THEREOF

FIELD OF THE INVENTION

The present invention relates to a coordinate input apparatus, and more particularly to a so-called touch panel type coordinate input apparatus which has a coordinate input face and by which the coordinates of a position on the coordinate input face touched by a finger or a pen can be inputted.

BACKGROUND OF THE INVENTION

To date, a touch panel type coordinate input apparatus which is connected to a display device, such as a display, and used has been employed. This type of coordinate input apparatus has a coordinate input face called "touch panel", supplies coordinates inputted on the coordinate input face to a display device, and superposes and displays letters and/or line drawings formed by inputted coordinates upon an image displayed on the display device.

As this type of coordinate input apparatus, for example, there is one disclosed in Japanese Patent Application Laid-Open No. 9-91094. This coordinate input apparatus comprises a coordinate input face 161 composed of a transparent glass substrate, two scanner lights 160 arranged in corners of the coordinate input face 161, and a reflection array 162 arranged in three sides around the coordinate input face 161 as shown in FIG. 18.

The scanner lights 160 emit approximately parallel lights to the coordinate input face 161. The lights that the scanner lights 160 emit are recursively reflected at the reflection array 162 on the whole area of the coordinate input face 161 and are received by the scanner lights 160. In this state, when coordinates are inputted on the coordinate input face 161 by means of a finger or a pen, the lights that the scanner lights 160 have emitted are shielded on the coordinates and do not reach to the reflection array 162, and no reflection is received at the scanner lights 160. The two scanner lights 160 in the right and the left sides specify straight lines that pass through the inputted coordinates by angles of rotation, respectively, when no reflection is received and detect the coordinates inputted as the point of intersection of both straight lines.

In a meeting or a presentation where this type of coordinate input apparatus is employed, there is an occasion in which writing on a display device simultaneously by a plurality of operators is desired in order to smoothly proceed questions and answers or the like. However, when two operators input, for example, a point P1 (x1, y1) and a point P2 (x2, y2), respectively, through the coordinate input apparatus shown in FIG. 18, one scanner light 160 detects rotation angles $\theta_{L1}$, $\theta_{L2}$, and the other detects rotation angles $\theta_{R1}$, $\theta_{R2}$.

At this time the coordinate input apparatus of FIG. 18 cannot determine whether the coordinates inputted are to be decided by combining the rotation angle $\theta_{L1}$ and the rotation angle $\theta_{R1}$ and the rotation angle $\theta_{L2}$ and the rotation angle $\theta_{R2}$ or combining the rotation angle $\theta_{L1}$ and the rotation angle $\theta_{R2}$ and the rotation angle $\theta_{L2}$ and the rotation angle $\theta_{R1}$. Thus, there is a fear that a point P1' and a point P2' as well as the inputted points P1, P2 may become considered as inputted points, thereby impeding writing on the display device by a plurality of operators.

SUMMARY OF THE INVENTION

It is an object of the present invention to provide a coordinate input apparatus and a recording medium of a coordinate input apparatus wherein when a plurality of sets of coordinates are inputted, these sets of coordinates can be distinguished for each pointing means and thus inputting by a plurality of operators is possible.

That is, a coordinate input apparatus according to the present invention is characterized in comprising a coordinate input face where coordinates are inputted by a pointing means, at least two angle detection means respectively periodically detecting respective angles formed by straight lines connecting a pointed point pointed by the pointing means on the coordinate input face and reference points on the coordinate input face and a reference line on the coordinate input face, an angle storing means storing the angles detected during an immediately earlier cycle among angles periodically detected, an angle choosing means choosing angles which are most adjacent to the angles stored in the angle storing means among angles detected at this time when the number of angles of this detection time periodically detected by the angle detection means is greater than that of angles of the last time, and a coordinate detection means detecting coordinates inputted by the pointing means based on the angles chosen by the angle choosing means.

By constituting like this, when pointing by a plurality of pointing means is performed on the coordinate input face, the pointed point pointed by the pointing means through which the previous coordinates have been detected can be discriminated and the coordinates thereof can be detected.

According to another aspect of this invention, this invention comprises a coordinate input face where coordinates are inputted by a pointing means, at least two angle detection means respectively periodically detecting respective angles formed by straight lines connecting a pointed point pointed by the pointing means on the coordinate input face and reference points on the coordinate input face and a reference line on the coordinate input face, an angle storing means storing the angles detected during an immediately earlier cycle among angles periodically detected, an angle choosing means choosing angles which are most adjacent to the angles stored in the angle storing means among angles detected at this time when the number of angles of this detection time periodically detected by the angle detection means is greater than that of angles of the last time, an identifier adding means adding a first identifier to the angle chosen by the angle choosing means, and a coordinate detection means detecting coordinates of the pointed point based on the angle detected by the angle detection means, wherein the coordinate detection means detects the coordinates of the pointing means which are continuous with the coordinates which are based on the angles stored in the angle storing means based on the angle to which the identifier adding means has added the first identifier, and the angle storing means stores the angle to which the identifier adding means has added the first identifier.

By constituting like this, when pointing by a plurality of pointing means is performed on the coordinate input face, the pointed point pointed by the pointing means through which the previous coordinates have been detected can be discriminated and while adding the first identifier, the coordinates thereof can be detected. Thus, a stroke drawn by pointed points to which the first identifiers are added can be detected.

According to a recording medium of coordinate input apparatus according to the present invention, a program is stored readable by a central processing unit of a coordinate input apparatus comprising a coordinate input face where coordinates are inputted by a pointing means and at least two angle detection means respectively periodically detecting respective angles formed by straight lines connecting a pointed point pointed by the pointing means on the coordinate input face and reference points on the coordinate input face and a reference line on the coordinate input face, wherein the recording medium stores a program comprising an angle storing step storing the angles detected during an immediately earlier cycle among angles periodically detected, an angle choosing step choosing angles which are most adjacent to the angles stored in the angle storing step among angles detected at this time when the number of angles of this detection time periodically detected is greater than that of angles of the last time, and a coordinate detection step detecting coordinates inputted by the pointing means based on the angles chosen by the angle choosing step.

By constituting like this, when pointing by a plurality of pointing means is performed on the coordinate input face, the pointed point pointed by the pointing means through which the previous coordinates have been detected can be discriminated and the coordinates thereof can be detected. Further, the program can be made software, thereby eliminating the necessity of employing an exclusive constitution for the central processing unit.

According to another aspect of this invention, this invention comprises a program is stored readable by a central processing unit of the coordinate input apparatus comprising a coordinate input face where coordinates are inputted by a pointing means, at least two angle detection means respectively periodically detecting respective angles formed by straight lines connecting a pointed point pointed by the pointing means on the coordinate input face and reference points on the coordinate input face and a reference line on the coordinate input face, and angle storing means storing the angles detected during an immediately earlier cycle among angles periodically detected by the angle detection means, wherein the recording medium stores a program comprising an angle choosing step choosing angles which are most adjacent to the angles stored in the angle storing means among angles detected at this time when the number of angles of this detection time periodically detected is greater than that of angles of the last time, a first identifier adding step adding a first identifier to the angle chosen in the angle choosing step, a coordinate detection step detecting the coordinates of the pointing means which are continuous with the coordinates which are based on the angles stored in the angle storing step based on the angle to which the first identifier has been added in the first identifier adding step, and a substituting and storing step substituting and storing the angle to which the first identifier has been added in the first identifier adding step.

By constituting like this, when pointing by a plurality of pointing means is performed on the coordinate input face, the pointed point pointed by the pointing means through which the previous coordinates have been detected can be discriminated and while adding the first identifier, the coordinates thereof can be detected. Thus, a stroke drawn by pointed points to which the first identifiers are added can be detected. The program can be made software, thereby eliminating the necessity of employing an exclusive constitution for the central processing unit.

Other objects and features of this invention will become understood from the following description with reference to the accompanying drawings.

DESCRIPTION OF THE PREFERRED EMBODIMENTS

In the below, the first embodiment and the second embodiment of the present invention will be explained.

First, prior to explanation regarding the first embodiment and the second embodiment of the present invention, a coordinate detection principle of a coordinate input apparatus to which the present invention is applied will be explained using two examples.

(The constitution and the coordinate detection principle of a coordinate input apparatus to which the present invention is applied.)

1. The First Example

Figure 1:
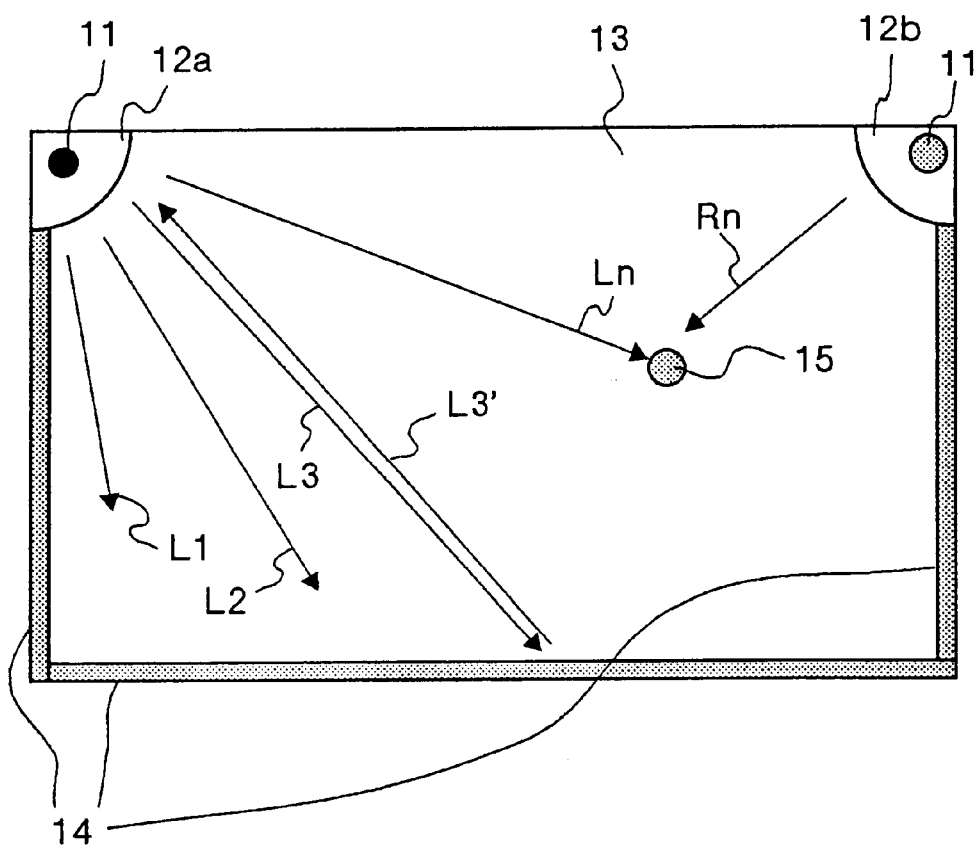
FIG. 1 is a view for explaining a first example of a coordinate input apparatus which is applied to the present invention.

FIG. 1 shows a top view of a coordinate input apparatus for explaining the coordinate input apparatus of the first example. An angle detection means of the constitution shown by the drawing comprises a panel 13 being a coordinate input face on which coordinates are inputted by a pointing means 15, such as a finger, a pointing rod, and the like, light emitting/receiving sections 12a, 12b being light emitting means and light receiving means arranged at positions at which the reflection of the light that the light emitting means emit can be received, a recursive reflection member 14 being a reflection means recursively reflecting the light that the light emitting/receiving sections 12a, 12b emit, and condenser lenses 50 (FIG. 3 to FIG. 5C) being optical means making different positions of the light emitting/receiving sections 12a, 12b receive the reflection reflected at the recursive reflection member 14 according to incident angles to the light emitting/receiving sections 12a, 12b.

The panel 13 of the coordinate input apparatus of the first example has a shape of approximately quadrangle and may be a display electronically displaying an image or a white board on which writing is possible using a marker or the like.

The light emitted by a light source 11 incorporated in the light emitting/receiving section 12a spreads fan-shapely over the whole area of the coordinate input face as luminous flux having L1, L2, . . . Ln as optical axes. Paying attention, for example, to the optical axis L3 among the luminous flux, the reflection of the luminous flux of the optical axis L3 (luminous axis L3') is reflected at the recursive reflection member 14 and travels toward the light emitting/receiving section 12a through the same optical axis as the optical axis L3. The light emitting/receiving section 12a is provided with a light receiving means described later so as to receive the reflection. The light receiving means is constituted so as to receive the reflection regarding all luminous flux represented by the optical axes L1, L2, . . . Ln.

When an operator inputs coordinates by putting the pointing means 15, such as a finger or a pen, on a point inside the panel 13, a part of luminous flux including the optical axes L1, L2, . . . Ln is shielded by the pointing means 15 and thus does not reach to the recursive reflection member 14. Thus, the reflection of the luminous flux shielded by the pointing means 15 is not received at the light receiving means 12a, and the point where the pointing means 15 is put, that is, the optical axis of the light passing through the coordinates inputted, can be distinguished by means of the luminous flux that has not been received.

Similarly, while the reflection of the luminous flux emitted from a light source 11 of the light emitting/receiving section 12b is received, the optical axis passing through the coordinates inputted by the pointing means 15 can be distinguished. In FIG. 1, the optical axis Ln emitted from the light emitting/receiving section 12a and the optical axis Rn emitted from the light emitting/receiving section 12b correspond to optical axes passing through the coordinates inputted by the pointing means 15. The coordinates of the pointing means 15 can be calculated as the point of intersection of the optical axis Ln and the optical axis Rn.

Figure 2:
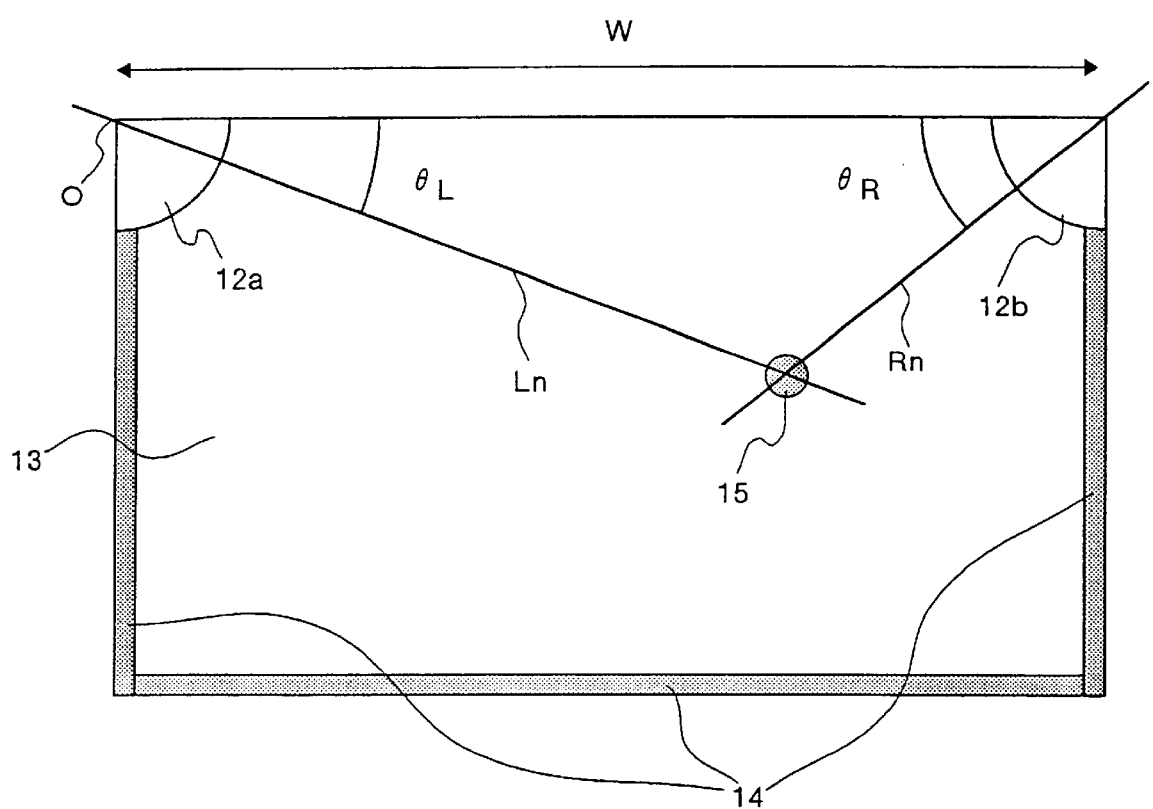
FIG. 2 is another view for explaining the first example of the coordinate input apparatus which is applied to the present invention.

In this state in the coordinate input apparatus of the first example, straight lines connecting the pointed point (inputted coordinates) that the pointing means 15 has pointed and standard points (central points of the light sources 11) on the panel 13 are specified so that the optical axis Ln and the optical axis Rn passing through the coordinates inputted are detected by detecting angle $\theta_L$ and angle $\theta_R$ formed by the straight lines and a standard line (being the straight line connecting the standard points of the light sources 11 each other) on the panel 13 as shown in FIG. 2. The coordinates of the pointing means 15 are detected using the angle $\theta_L$, the angle $\theta_R$ and a length W (being the installation interval of the light emitting/receiving sections 12a, 12b) of the standard line on the panel 13 as described later.

Next, in order to explain concrete calculations for seeking the aforementioned angles $\theta_L$, s, the constitution of the light emitting/receiving section 12a and the light emitting/receiving section 12b and the mechanism for seeking optical axes of the light shielded will be explained. The light emitting/receiving sections 12a, 12b are similarly constituted. Thus, here, only the constitution regarding the light emitting/receiving section 12a is depicted in the drawings, omitting the explanation regarding the light emitting/receiving section 12b.

Figure 3:
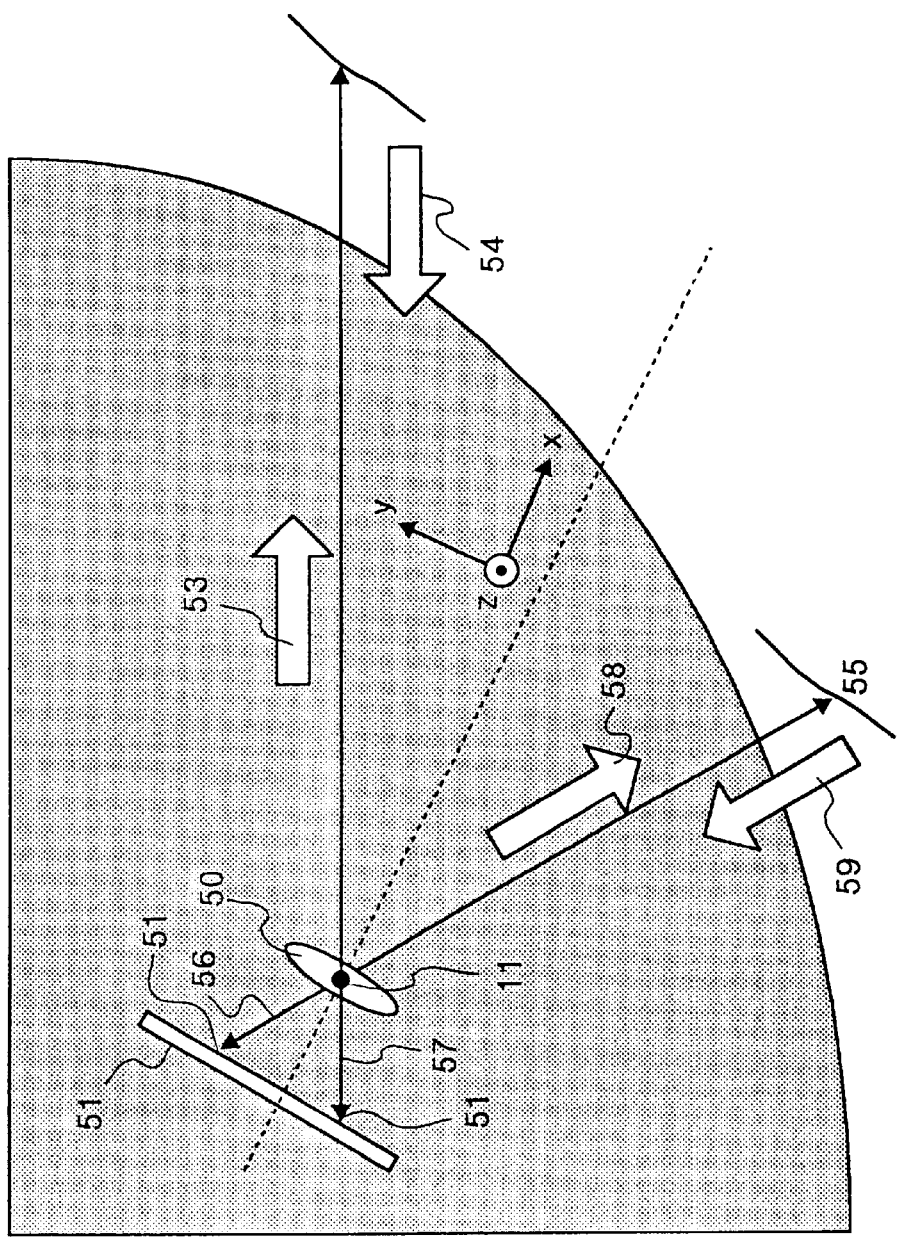
FIG. 3 is another view for explaining the first example of the coordinate input apparatus which is applied to the present invention.

FIG. 3 is a view showing an outline of the constitution of the light emitting/receiving section 12a and is a view in which the light emitting/receiving section 12a is viewed from the vertical direction on the panel 13. The light emitting/receiving section 12a is composed roughly of the light source 11, the condenser lens 50, and a photo detector 51. The light source 11 emits fan-shape light to the opposite side to the photo detector 51, and the fan-shape light is considered as an assembly of luminous flux emitted or reflected in the directions of an arrow 53, an arrow 54, an arrow 58, and an arrow 59. The light emitted in the direction of the arrow 53 is reflected at a reflection member in the direction of the arrow 54 and then passes through the condenser lens 50 so as to be received at a position of a point 51b on the photo detector 51. The light emitted in the direction of the arrow 58 is reflected at a reflection member in the direction of the arrow 59 and is received at a position of a point 51a on the photo detector 51.

The optical axis of the light emitted from the light source 11 and reflected at the recursive reflection member and its light receiving position have a relationship of one to one. Thus, by examining a received light intensity distribution on the photo detector 51, it may be understood as to through which optical axis the light shielded has been emitted or reflected. By seeking the optical axes with respect to both of the light emitting/receiving section 12a and the light emitting/receiving section 12b, two straight lines that intersect at the point inputted by the pointing means 15 can be obtained.

In the coordinate input apparatus of the second example, a CCD line sensor is employed as the photo detector 51 so as to output a signal representing the received light intensity distribution on the photo detector 51 to the outside. Hereafter, in the present description, the signal representing the received light intensity distribution on the photo detector 51 that the photo detector 51 outputs is denoted by a light intensity distribution signal.

Figure 4:
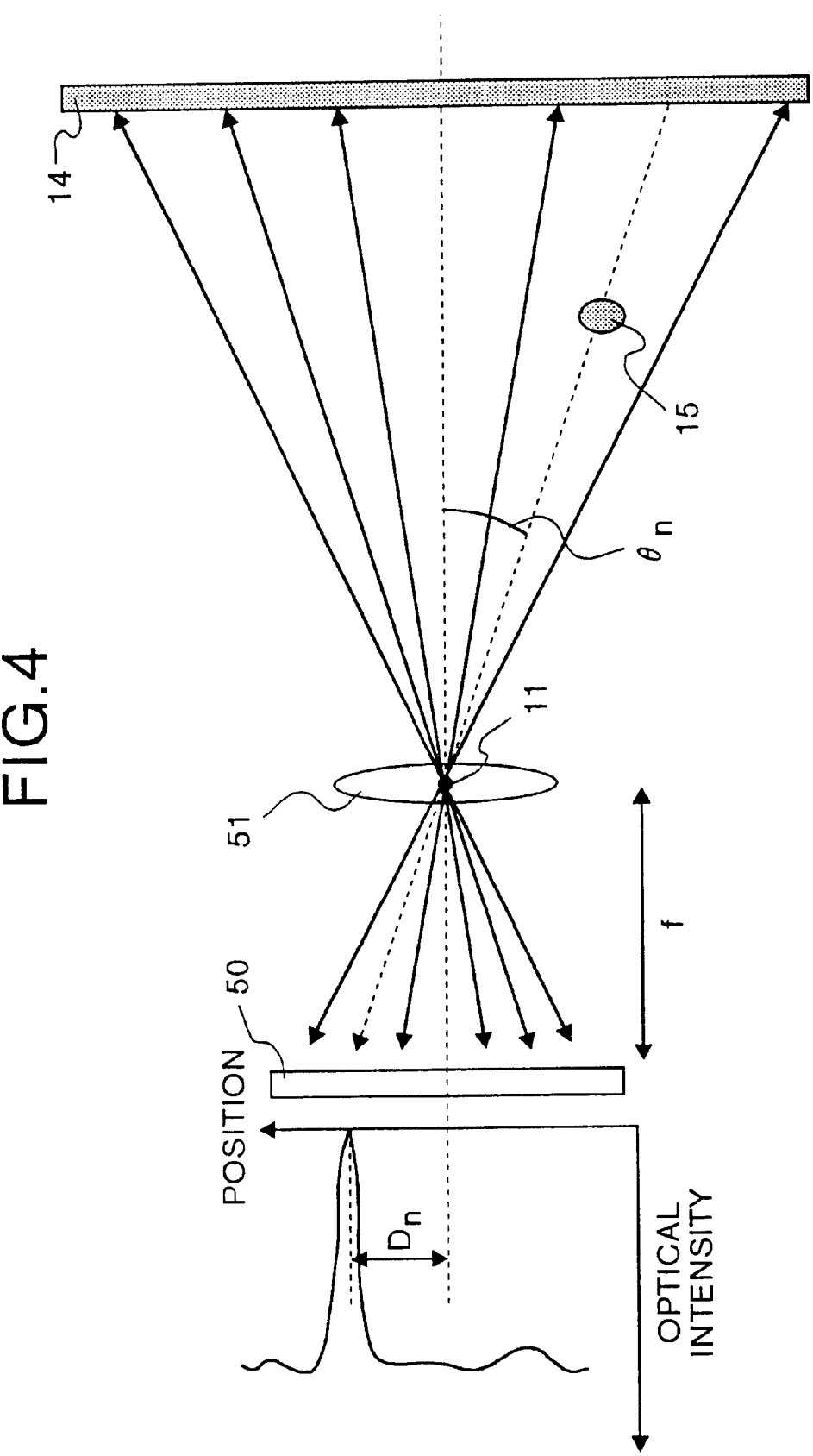
FIG. 4 is another view for explaining the first example of the coordinate input apparatus which is applied to the present invention.

FIG. 4 is a view for explaining the relationship between the received light intensity on the photo detector 51 and the optical axis of the light shielded. In FIG. 4, the condenser lens 50 is arranged so that the center of the condenser lens 51 corresponds to the light source 11. The light emitted from the light source 11 is recursively reflected at the recursive reflection member 14 and is received on the photo detector 51, passing through the center of the condenser lens 50. At this time, the intensity distribution on the photo detector 51 becomes nearly uniformly if there is nothing to shield the light on the coordinate input face. However, when the light is shielded by the pointing means 15 shown in the drawings, the received light intensity at the light receiving position of the light passing through the pointing means 15 on the photo detector 51 drops. The point on the photo detector 51 where the received light intensity is low will be called a dark point hereafter.

In FIG. 4, a position $D_n$ (hereafter, may also be called a dip position) of the dark point, taking the central point of the photo detector 51 as a basis is shown. This $D_n$ has a corresponding relationship expressed by the following expression (1) with an angle $\theta_n$ formed by the straight line passing through the dark point and the straight line passing through the central point of the photo detector 51.

$$\theta n = \arctan(D_n/f) \qquad (1)$$

The f in the expression (1) is the distance between the center of the condenser lens 50 and the surface of the photo detector 51 as shown in FIG. 4.

Here, the angle $\theta_L$ shown in FIG. 2 is expressed by a function of an angle $\theta_{nL}$ formed by the straight line L having the angle $\theta_L$ and the straight line passing through the center of the photo detector 51 and the center of the condenser lens 50 as an expression (2) shown below.

$$\theta_L = g(\theta_{nL}) \qquad (2)$$

$$\theta_{nL} = \arctan(D_{nL}/f) \qquad (3)$$

The relationships of the expression (2) and the expression (3) are similarly valid for the light emitting/receiving section 12b. Therefore, where $\theta_n$ of the light receiving/emitting side is $\theta_{nR}$, showing $\theta_R$ of FIG. 2, obtained are $$\theta_R = h(\theta_{nR}) \qquad (4)$$

where $$\theta_{nR} = \arctan(D_{nL}/f) \qquad (5)$$

Here, coordinates P (x, y) of the point P wherein o in FIG. 2 is the origin can be represented as follows.

$$x = W \cdot \tan \theta_R / (\tan \theta_L + \tan \theta_R) \qquad (6)$$

$$y = W \cdot \tan \theta_L \cdot \tan \theta_R / (\tan \theta_L + \tan \theta_R) \qquad (7)$$

As described above, the coordinates that the pointing means 15 inputs can be detected by detecting dark points on the photo detectors 51 which are provided in the light emitting/receiving sections 12a, 12b and seeking the distance between the dark points and the centers of the photo detectors 51.

Figure 5A:
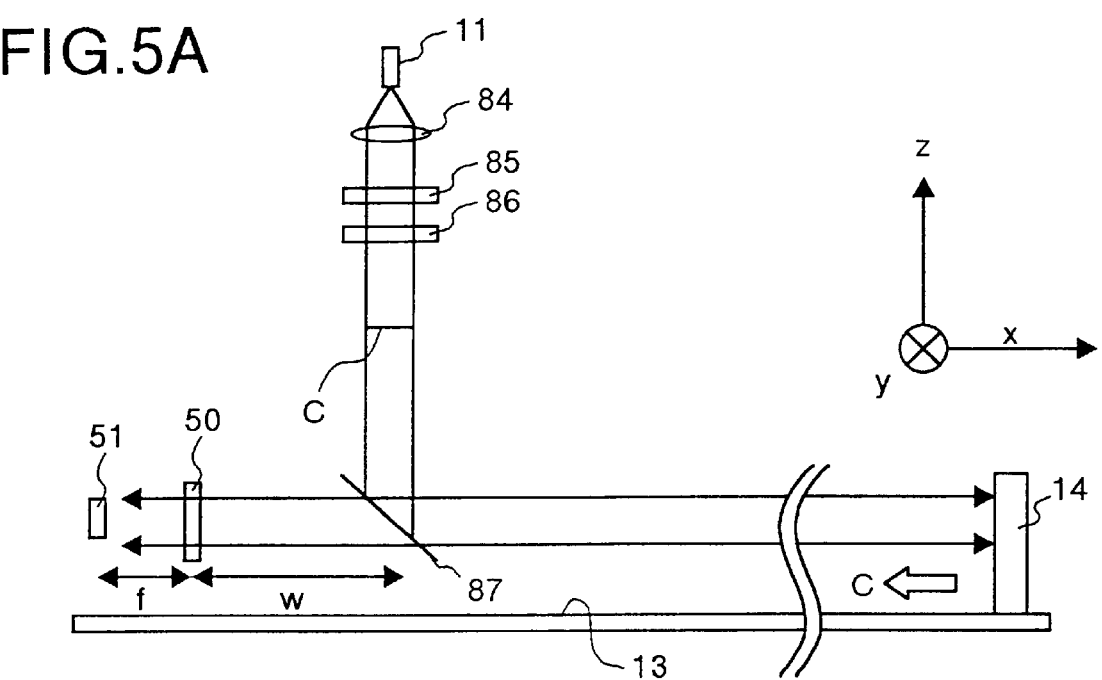
FIGS. 5A to 5C are other views for explaining the first example of the coordinate input apparatus which is applied to the present invention.
Figure 5B:
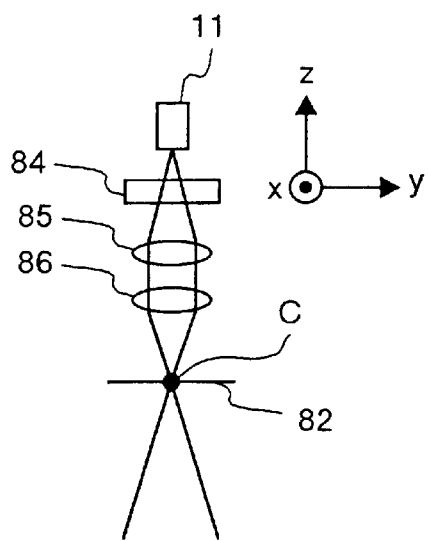
Figure 5C:
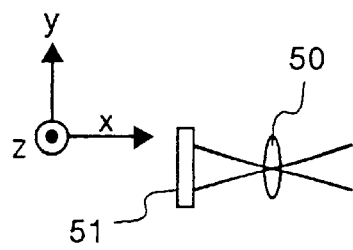

FIGS. 5A to 5C are views for explaining in detail the optical system of the light emitting/receiving section 12a shown in FIG. 3, wherein FIG. 5A is a schematic view for explaining the constitution of light emitting and light receiving of the light emitting/receiving section 12a, FIG. 5B is a view showing the constitution according to the light emitting of the schematic view of FIG. 5A, and FIG. 5C is a view explaining the constitution according to the light receiving of FIG. 5A. The light emitting/receiving section 12a is constituted so that the constitution of light receiving and light emitting shown in FIGS. 5A, 5B, 5C is unitedly incorporated. FIGS. 5A to 5C are those that are seen in the directions according to coordinate axes shown in each drawing, respectively.

As the light source 11 of the light emitting/receiving section 12a, a light source, such as a laser diode, a pin point LED, or the like, by which a spotlight with a diameter restricted in some degree can be produced is employed. The light vertically emitted from the light source 11 against the panel 13 is collimated only in the x direction by a cylindrical lens 84, and further is converged in the y direction in the drawing by a cylindrical lens 85 and a cylindrical lens 86. The curvature distributions of the cylindrical lens 84 and the cylindrical lenses 85, 86 are perpendicular to each other. The light passed through the three cylindrical lenses is converged into a line shape at a convergence section c. This convergence section c is also called secondary light source hereafter since it corresponds to the light source of the coordinate detection principle described above.

A slit which is not shown in the drawing is provided at a taking-out port at which the light is taken out from a beam-forming lens group composed of the cylindrical lens 84, the cylindrical lens 85, and the cylindrical lens 86, and the light of the secondary light source c is emitted from the slit to the coordinate input face. This irradiation light is reflected by a half mirror 87 and spreads fan-shapely when seen from the front side of the panel 13 (FIG. 5B). At this time the irradiation light does not spread in the perpendicular direction of the coordinate input face and becomes light parallel to the coordinate input face since being collimated by the cylindrical lens 84.

The light spreading on the panel 13 is reflected at the recursive reflection member 14, passes through the same optical axis as that of the time of being emitted, and proceeds toward the beam-forming lens group (the direction of an arrow C). Then, after passing through the half mirror 87, the light passes through the condenser lens 50 and is received by the photo detector 51 that is a CCD line sensor. At this time if there is the pointing means 15 on the panel 13, this pointing means 15 becomes a shield of light, and a dark point is generated on any one of CCD image sensor elements of the photo detector 51. The $D_n$ of the expression (2) described above is obtained through the position on the photo detector 51 of the CCD image sensor element that has become the dark point, and the coordinates that the pointing means 15 has inputted can be calculated based on this $D_n$ (FIG. 5C).

2. The Second Example

Figure 6:
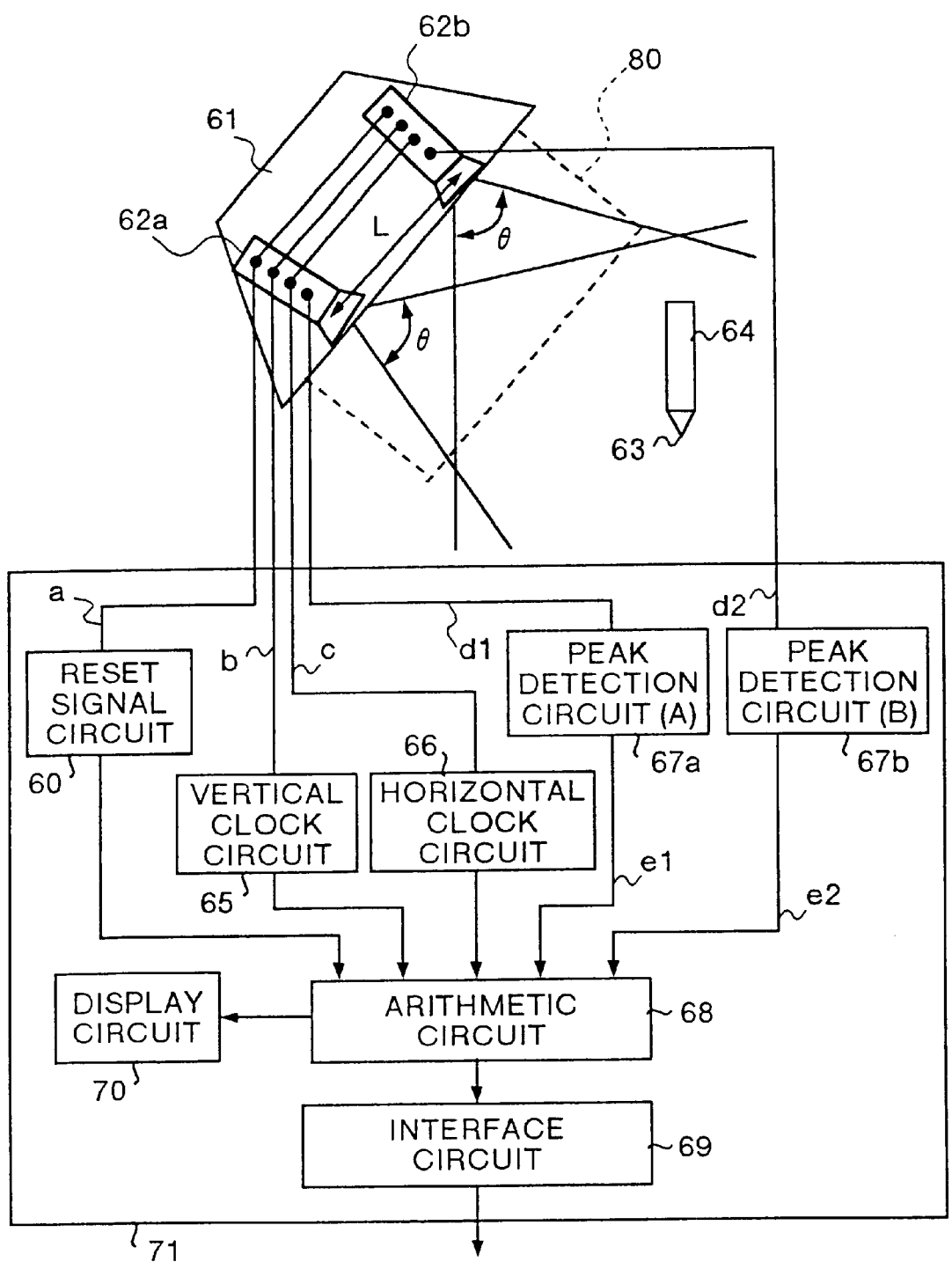
FIG. 6 is a view for explaining a second example of a coordinate input apparatus which is applied to the present invention.

FIG. 6 is a drawing for explaining the coordinate input apparatus of the second example. The constitution shown in the drawing is composed of an infrared position detection section 61 as an image input means, a control section 71, and a pen 64 as the pointing means. The infrared position detection section 61 can take nearly the whole area of a coordinate input area (coordinate input face) 80 in and has two infrared CCD cameras 62a, 62b arranged an interval L away from each other. The infrared LED 63 is provided at the tip of the pen 64.

The control section 71 has a reset signal circuit 60 generating a reset signal "a" for resetting the infrared CCD cameras 62a, 62b, a vertical clock circuit 65 generating a vertical clock signal b for vertically scanning the infrared CCD cameras 62a, 62b, and a horizontal clock circuit 66 generating a horizontal clock signal c for horizontally scanning the infrared CCD cameras 62a, 62b. The reset signal a, the vertical clock signal b, and the horizontal clock signal c are inputted to the infrared CCD cameras 62a, 62b and correspond to the signals making the infrared CCD cameras 62a, 62b start scanning in the X-Y directions.

Further, the control section 71 has peak detection circuits 67a, 67b detecting peaks of video signals d1, d2 which the infrared CCD cameras 62a, 62b output and outputting peak detection signals e1, e2, an arithmetic circuit 68 calculating the coordinates that the pen 64 inputs, an interface circuit 69 for outputting the coordinates calculated by the arithmetic circuit to an external appliance, and a display circuit 70 for displaying. The operability of the coordinate detection apparatus shown in the drawing can further be improved by providing it with an audio circuit (not shown) generating an alarm sound or the like when the pen 64 inputs coordinates outside the image taking-in area of the infrared detection section 61.

Further, in the coordinate detection apparatus shown in the drawing, the resolutions and the detection areas of the infrared CCD cameras 62a, 62b can be set according to the size of the coordinate input area 80, the input precision required, and the like by providing the infrared CCD cameras 62a, 62b with a lens magnification adjustment circuit or a focal length adjustment circuit. Although the control section 71 and the infrared detection section 61 are different bodies in the constitution shown in FIG. 6, both parts can be integrated into one body by miniaturizing each circuit incorporated in the control section 71.

Figure 7:
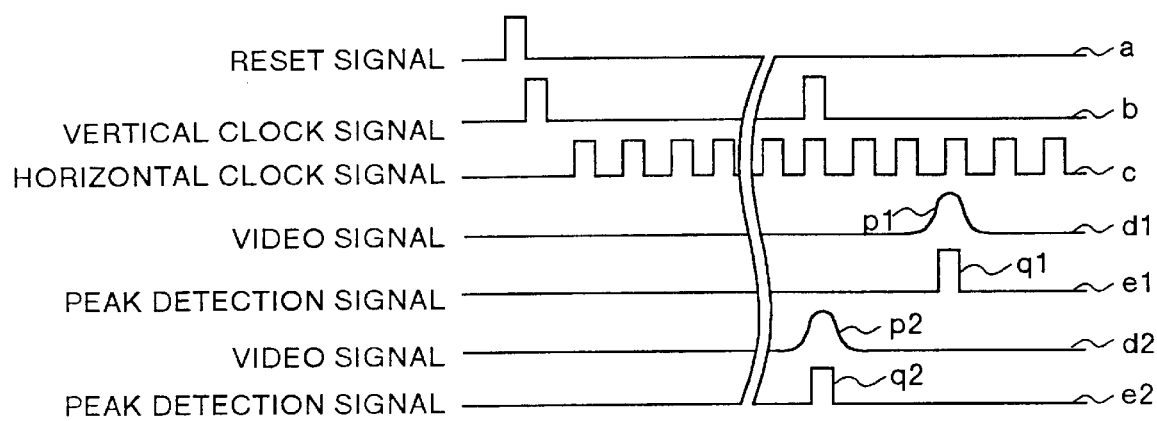
FIG. 7 is another view for explaining the second example of the coordinate input apparatus which is applied to the present invention.

FIG. 7 is a timing chart for explaining each signal's processing performed in the coordinate input apparatus shown in FIG. 6. The reset signal a, the vertical clock signal b, the horizontal clock signal c are simultaneously inputted to the infrared CCD cameras 62a, 62b, respectively, by the timing shown in the drawing. The infrared position detection section 61 inputs the video signals d1, d2 outputted from the infrared CCD cameras 62a, 62b to the control section 71 by the inputs of the reset signal a, the vertical clock signal b, and the horizontal clock signal c.

The video signals d1, d2 are signals expressing images obtained by photographing the pen 64 by the infrared CCD cameras 62a, 62b. In this situation, since the exposures of the infrared CCD cameras 62a, 62b are contracted, only the infrared LED 63 is shown on the infrared CCD cameras 62a, 62b, and other parts are photographed as a black color image. Thus, strong peak signals p1, p2 corresponding to the position of the infrared LED 63 are manifested in the video signals d1, d2 outputted from the infrared CCD cameras 62a, 62b.

The peak detection circuit 67a, 67b detect the peak signals p1, p2 and output peak detection signals e1, e2 having peak signals q1, q2. These peak detection signals e1, e2 are supplied to the arithmetic circuit 68. A ROM not shown is incorporated in the arithmetic circuit 68, and in this ROM, translation tables converting the peak signals q1, q2 manifested in the peak detection signals e1, e2 into angle data representing the position of the infrared LED 63 by angles, respectively, are stored. The angle data specify straight lines connecting the position of the infrared LED 63 and reference points on the coordinate input area 80 (e.g., origins of the infrared CCD cameras 62a, 62b) and represent the position of the infrared LED 63 by the angles formed by these straight lines and a reference line on the coordinate input area 80 (e.g., a straight line connecting the origins of the infrared CCD cameras 62a, 62b).

The arithmetic circuit 68 converts the peak signals e1, e2 into angles, respectively, as described above and specifies two angles. Further, the arithmetic circuit 68 then calculates the position where the infrared LED 63 is put, that is, the coordinates inputted by the pen 64, using the distance L between the infrared CCD cameras 62a, 62b. The coordinates obtained are outputted to an external display device via the interface circuit 69 or are outputted to and displayed at the display circuit 70.

Figure 8:
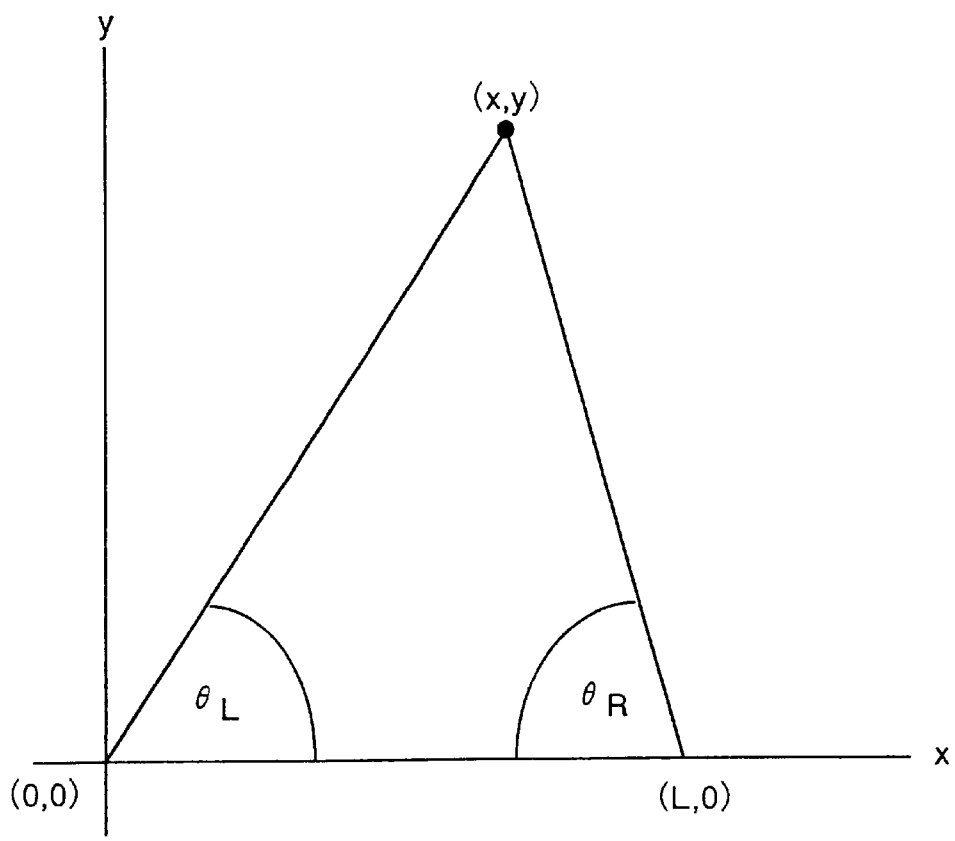
FIG. 8 is another view for explaining the second example of the coordinate input apparatus which is applied to the present invention.

Next, a method for detecting the coordinates inputted through angle data will be concretely explained employing FIG. 8. FIG. 8 shows the coordinates (x, y) that the pen 64 has inputted on two dimensional coordinates where one of the origins of the infrared CCD cameras 62a, 62b (the left bottom corner on the photographing area in the drawing) is taken as the origin (0, 0)

The arithmetic circuit 68 detects the peak detection signals e1, e2 and seeks the coordinates (x1, y1) of the pen 64 using the coordinates where the origins of the infrared CCD camera 62a is taken as the origin and the coordinates (x2, y2) of the pen 64 using the coordinates where the origin of the infrared CCD camera 62b is taken as the origin from the relationship between the peak signals q1, q2 represented here and the vertical clock signal b and the horizontal clock signal c taking the reset signal "a" as the origin. The position of the pen 64 which is seen from the infrared CCD cameras 62a, 62b is expressed by the angle $\theta_L$, $\theta_R$, using these coordinates (x1, y1) and the coordinates (x2, y2) and using the coordinates shown in FIG. 8 as follows.

$$\theta_L = \tan^{-1}(y1/x1) \tag{8}$$

$$\theta_R = \tan^{-1}(y2/x2) \tag{9}$$

Then, by seeking the angles $\theta_L$, $\theta_R$ from the expressions (8), (9) in the above and further employing the distance L between the infrared CCD cameras 62a, 62b, the coordinates (x, y) that the pen 64 has inputted expressed by the coordinates shown in FIG. 8 can be obtained by the following expressions.

$$y = x \tan \theta_L \tag{10}$$

$$y = (x-L)\tan(\pi-\theta_R) \tag{11}$$

The coordinates (x, y) inputted by the pen 64 can be calculated by seeking x, y, taking the above expressions (10), (11) as a linear equation system. The translation tables of the arithmetic circuit 68 described earlier stores previously calculated results related to (x1, y1), (x2, y2) in order to perform the processing like this faster. In this type of coordinate detection apparatus of the second example, there is no necessity of putting a tablet board or the like on a bench, and thus a work space can be effectively utilized. Even in the case in which a copy or the like is superposed on the coordinate input area 80, inputting coordinates for the coordinate input apparatus is possible. Further, the image taking-in area of the infrared CCD cameras 62a, 62b as well as the resolution can be variably set by means of a lens magnification modulation circuit or the like, and thus the operability and convenience of the coordinate input apparatus can be enhanced.

First Embodiment

Figure 9:
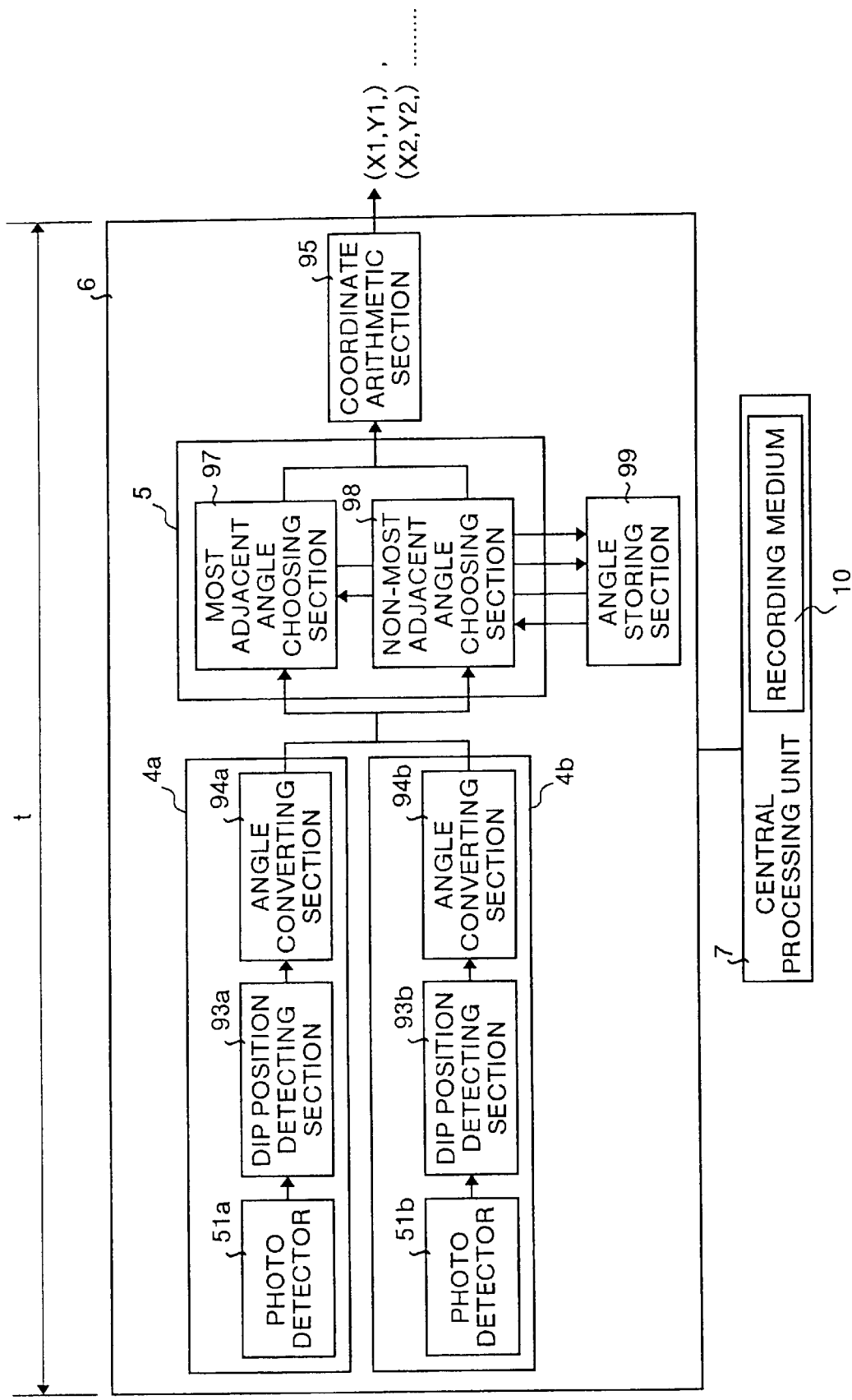
FIG. 9 is a block diagram for explaining a coordinate input apparatus of a first embodiment of the present invention.
Figure 10:
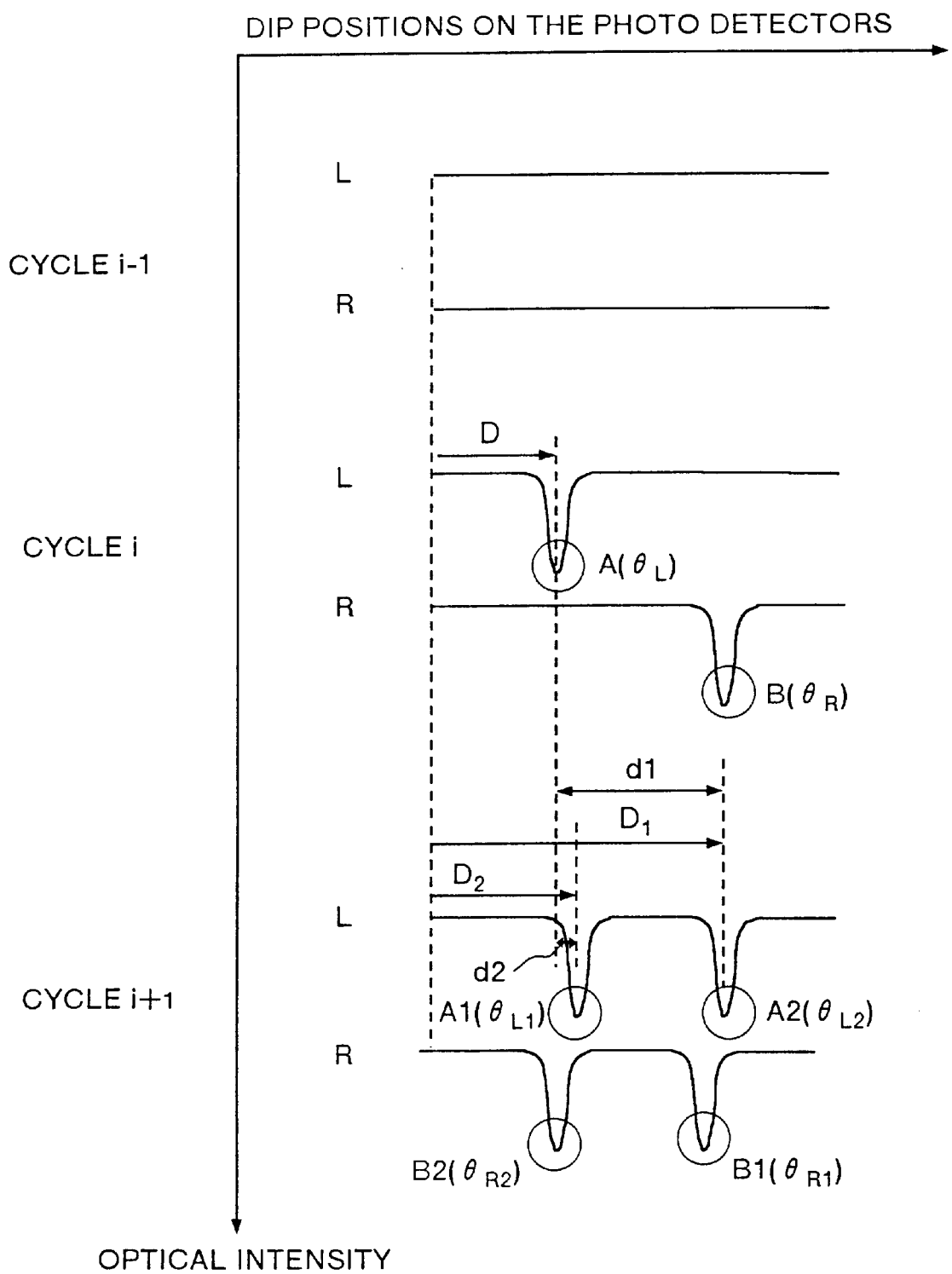
FIG. 10 is a view for explaining signals which are processed in coordinate input apparatuses of the first embodiment and a second embodiment of the present invention.

FIG. 9 is a block diagram for explaining the first embodiment of the present invention. FIG. 10 is a drawing for explaining processing of the coordinate detection performed in the constitution shown in FIG. 9 and is the drawing showing the relationship between the dip positions that the photo detector 51a and the photo detector 51b provided in angle detection sections 4a, 4b described later detect and cycle of detection. It is supposed that the coordinate input apparatus of the embodiment according to the present invention is constituted as the coordinate input apparatus of the first example among the coordinate input apparatuses described earlier.

The coordinate input apparatus of the first embodiment comprises the panel 13 (FIG. 1) as the coordinate input face to which coordinates are inputted by means of the pointing means 15 (FIG. 1), such as a finger, a coordinate detection executing section 6 executing the detection of coordinates inputted, and a central processing unit 7 controlling the coordinate detection executing section 6. The coordinate detection executing section 6 comprises at least two angle detection sections 4a, 4b as angle detection means periodically detecting angles formed by the straight lines connecting the coordinates inputted on the panel 13 by the pointing means 15 and the reference points on the panel 13 and the reference line on the panel 13, an angle storing section 99 as an angle storing means storing the angle detected in the cycle immediately earlier among angles detected by the angle detection sections 4a, 4b, an angle choosing section 5 as an angle choosing means choosing data most close to the angle data stored in the angle storing section 99 from angle data detected at this time when the number of angles of this detection time periodically detected by the angle detection sections 4a, 4b is greater than that of angles of the last detection time, and a coordinate arithmetic section 95 as a coordinate detection means detecting the coordinates inputted by the pointing means 15 based on the angle chosen by the angle choosing section 5.

The angle detection sections 4a, 4b of the first embodiment have the photo detectors 51a, 51b photographing the pointing means 15 and outputting it as the light intensity distribution signal, respectively. The photo detectors 51a, 51b periodically input the light intensity distribution signal to the coordinate detection executing section 6. The angle detection sections 4a, 4b of the first embodiment comprises dip position detecting sections 93a, 93b generating the light intensity distribution signals based on the light that the photo detectors 51a, 51b have received and detecting the dip positions from the light intensity distribution signals, respectively, and angle converting sections 94a, 94b converting them into angles. The angle choosing section 5 comprises a most adjacent angle choosing section 97 and a non-most adjacent angle choosing section 98.

The coordinate arithmetic section 95 is constituted so as to detect the coordinates inputted by other pointing means based on the angle which has not been chosen by the angle choosing section 5 when the number of angles of this detection time periodically detected by the angle detection sections 4a, 4b is one greater than that of angles of the last detection time for each angle detection section 4a, 4b.

In the central processing unit 7, a recording medium 10, such as, for example, a floppy desk, in which a program controlling each constitution contained in the coordinate detection executing section 6 is stored is set. The central processing unit 7 reads the program stored in the recording medium 10 and controls each constitution of the coordinate detection executing section 6 according to the content of the program. Employing a replaceable floppy desk or the like as the recording medium 10 begets an advantage that a general purpose appliance, such as a personal computer, can be used as the central processing unit 7.

Next, processing performed in the constitution shown in FIG. 9 will be explained using FIG. 10. The dip position detecting sections 93a, 93b calculate the dip positions by the method explained by FIG. 3. The dip positions are converted into angles formed by the straight lines connecting the pointed point pointed on the panel 13 by the pointing means 15 and the reference points on the panel 13 and the reference line on the panel 13 at the angle converting sections. The reason to convert the dip positions into angles is to later calculate the coordinates, using the expressions (1) to (7) at the coordinate arithmetic section 95. In the first embodiment, it is supposed that the reference points on the panel 13 are the central points of the light sources 11 incorporated in the light emitting/receiving sections 12a, 12b and the reference line is the line connecting the central points of the light sources 11 incorporated in the light emitting/receiving sections 12a, 12b as shown in FIG. 2.

FIG. 10 is a drawing showing the light intensity distribution signal (shown by L in the drawing) periodically detected at the photo detector 51a and the light intensity distribution signal (shown by R in the drawing) periodically detected at the photo detector 51b with respect to detection cycles i−1, i, i+1. In the drawing, the vertical axis shows the optical intensity of the light intensity distribution signals, and the horizontal axis shows the dip positions on the photo detectors 51a, 51b.

As shown in the drawing, there is no peak in either of L, R in the light intensity distribution signals inputted from the photo detectors 51a, 51b in the cycle i−1 to the dip position detecting sections 93a, 93b, thereby showing no input of coordinates on the panel 13. At this time the dip position detecting sections 93a, 93b generate a signal "null" expressing "there is no dip" and input it to the angle converting sections 94a, 94b.

The angle converting sections 94a, 94b receive the signal null and generate a signal null similarly. Further, the angle choosing section 5 receiving this signal null generates a signal null and outputs it to the coordinate arithmetic section 95. The coordinate arithmetic section 95, when receiving the signal null, outputs a signal null, or outputs no signal. The signal null generated at the angle choosing section 5 is also inputted to and stored in the angle storing section 99.

Next, in the detection of the cycle i, a signal expressing a dip (a dip signal) A is manifested in the light intensity distribution signal L inputted from the photo detector 51a to the dip position detecting section 93a. A dip signal B is manifested in the light intensity distribution signal R inputted from the photo detector 51b to the dip position detecting section 93b. The dip signal A and the dip signal B are inputted to the photo detectors 51a, 51b and are converted into the angles $\theta_L$, $\theta_R$ at the angle converting sections 94a, 94b, respectively, after the dip positions are detected at the dip position detecting sections 93a, 93b. At this time the angles $\theta_L$, $\theta_R$ are inputted to the coordinate arithmetic section 95 via the angle choosing section 5 as combined data ($\theta_L$, $\theta_R$) (angle data), are converted into the coordinates inputted by the pointing means 15, and are outputted. The dip signal A and the angle data ($\theta_L$, $\theta_R$) based thereon are also outputted to the angle storing section 99 and are substituted for the signal null stored previously.

Next, at the detection of the cycle i+1, a dip signal A1 and a dip signal A2 are manifested in the light intensity distribution signal L inputted from the photo detector 51a to the dip position detecting section 93a. In the light intensity distribution signal R inputted from the photo detector 51b to the dip position detecting section 93b, a dip signal B1 and a dip signal B2 are manifested. This state is generated in the case in which inputting by the pointing means 15 detected at the cycle i and other pointing means is performed.

In this case, the dip signals A1, A2 and the dip signals B1, B2 are converted into the angles $\theta_{L1}$, $\theta_{L2}$, $\theta_{R1}$, $\theta_{R2}$, respectively, at the angle converting sections 94a, 94b after the dip positions are detected at the dip position detecting sections 93b, 93b. The angles $\theta_{L1}$, $\theta_{L2}$, $\theta_{R1}$, $\theta_{R2}$ are then inputted to the angle choosing section 5 to become angle data combined so as to correctly express the coordinates inputted.

That is, the angle choosing section 5 outputs the angles $\theta_{L1}$, $\theta_{L2}$, $\theta_{R1}$, $\theta_{R2}$ to the most adjacent angle choosing section 97 and the non-most adjacent angle choosing section 98. The most adjacent angle choosing section 97 and the non-most adjacent angle choosing section 98 read angle data ($\theta_L$, $\theta_R$) stored in the angle storing section 99 and compare the angle $\theta_L$ with the angle $\theta_{L1}$ and the angle $\theta_{L2}$. They also compare the angle $\theta_R$ with the angle $\theta_{R1}$ and the angle $\theta_{R2}$. Next, these comparisons will be explained in detail. Since the comparison of the angle $\theta_L$ with the angle $\theta_{L1}$ and the angle $\theta_{L2}$ and the comparison of the angle $\theta_R$ with the angle $\theta_{R1}$ and the angle $\theta_{R2}$ are performed in the similar procedures, procedure with respect only to the photo detector 51a will be explained here.

The comparison of the angle $\theta_L$ with the angle $\theta_{L1}$ and the angle $\theta_{L2}$ is performed, for example, by taking a difference d1 between a dip position D of $\theta_L$ stored in the angle storing section 99 and a dip position D.sub.1 of the angle $\theta_{L1}$ (dip signal A1) detected at this time and further taking a difference d2 between the dip position D of $\theta_L$ and a dip position D.sub.2 of the angle $\theta_{L2}$ (dip signal A2) detected at this time so as to compare d1 with d2 as shown in FIG. 10.

The most adjacent angle choosing section 97 adopts the dip signal A1 in which the difference with the dip position D is smaller and the angle $\theta_{L1}$ obtained by converting the dip signal A1 and outputs it to the coordinate arithmetic section 95 as well as the angle storing section 99. At this time the dip signal B1 and the angle $\theta_{R1}$ obtained by converting the dip signal B1 is adopted by similar processing and is outputted to the coordinate arithmetic section 95 as well as the angle storing section 99.

The angle storing section 99 forms the angle data ($\theta_{L1}$, $\theta_{R1}$) from the angle $\theta_{L1}$ and the angle $\theta_{R1}$ and substitute them for the angle data ($\theta_L$, $\theta_R$). The coordinate arithmetic section 95 performs calculation based on the angle $\theta_{L1}$ and the angle $\theta_{R1}$ inputted and detects the coordinates (x1, y1) inputted by the pointing means 15 represented by the angle data ($\theta_{L1}$, $\theta_{R1}$). In the above constitution, processing from the generation of the light intensity distribution signals at the photo detectors 51a, 51b until the coordinate arithmetic section 95 is outputted is repeatedly performed by the cycle t.

Choosing the dip signals and the angles described above are performed, supposing that the differences between coordinates detected through continuous cycles are a little since the detection by the light emitting/receiving sections 12a, 12b is performed at a relatively fast cycle, 1/30 seconds. The coordinates inputted with a relatively greater difference from the coordinates detected earlier are considered to be coordinates inputted by other pointing means.

As shown in FIG. 10, the number of angles increased by the detection of the last time and the detection of this time is one for each angle detection section 4a, 4b, and angle data that angles which have not been adopted can form include only one way. In this situation, the non-most adjacent angle choosing section 98 of the angle choosing section 5 forms angle data ($\theta_{L2}$, $\theta_{R2}$) using the angle $\theta_{L2}$, the angle $\theta_{R2}$ which have not been adopted and outputs them to the coordinate arithmetic section 95. The coordinate arithmetic section 95 detects the coordinates regarding the angle data ($\theta_{L2}$, $\theta_{R2}$) and outputs them as the coordinates (x2, y2) inputted by other pointing means.

The coordinate input apparatus of the first embodiment can be constituted so as to be provided with a rejection choosing section as an angle rejecting means rejecting the angles which have not been chosen by the angle choosing section 5 when the number of angles of this detection time periodically detected by the angle detection sections 4a, 4b is more than two greater than that of angles of the last detection time for either of the angle detection sections 4a, 4b.

Figure 11:
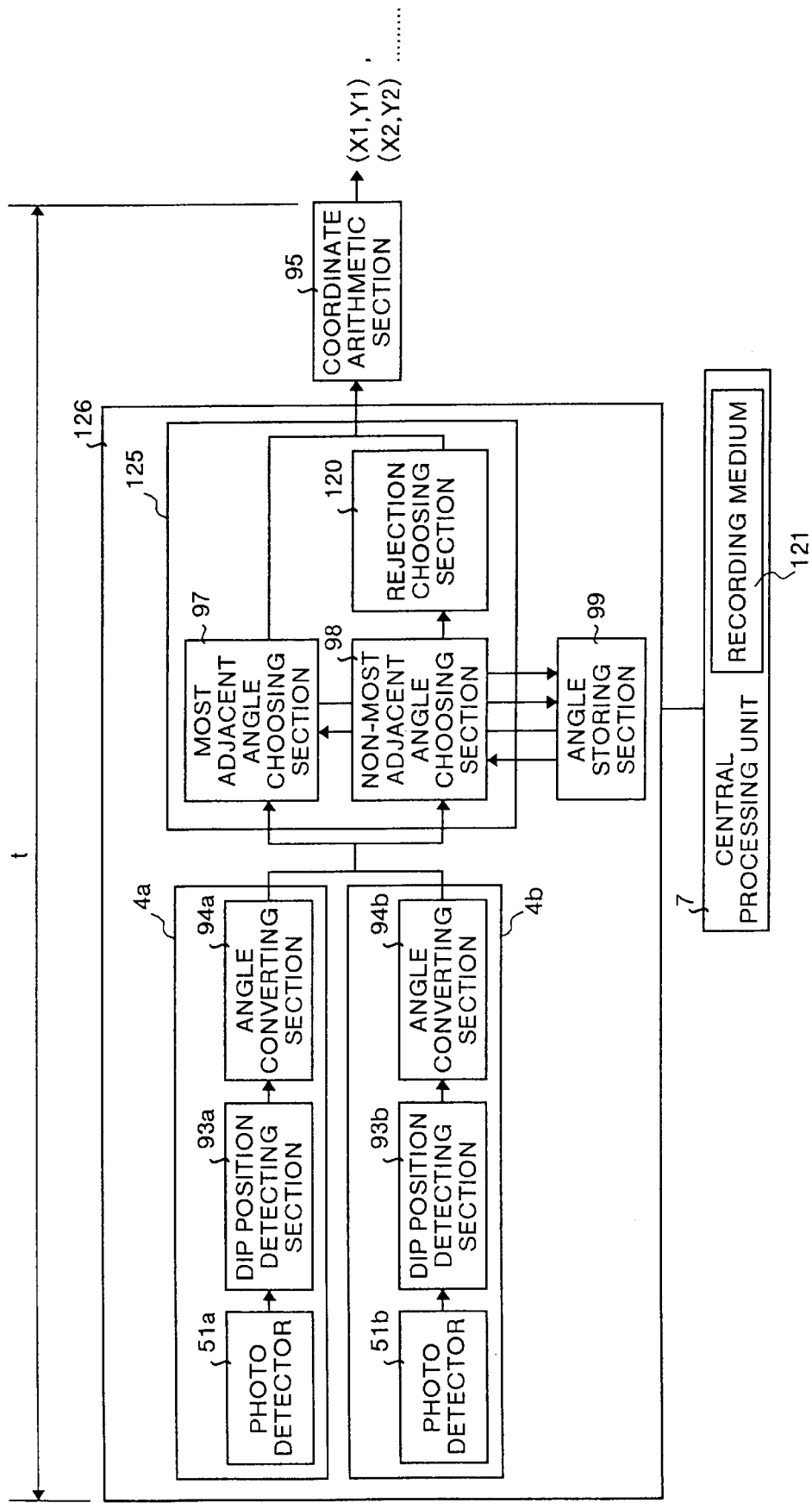
FIG. 11 is a block diagram for explaining a coordinate input apparatus of another example of the first embodiment of the present invention.

FIG. 11 is a block diagram for explaining the coordinate input apparatus of the first embodiment provided with a rejection choosing section 120. In the coordinate input apparatus shown in the drawing, the same reference numerals are put for the constitution similar to those of the coordinate input apparatus explained using FIG. 9 and the explanation thereof is omitted. A coordinate detection executing section 126 of the coordinate input apparatus shown in FIG. 11 comprises an angle choosing section 125 having the rejection choosing section 120 as well as the most adjacent angle choosing section 97 and the non-most adjacent angle choosing section 98. The central processing unit 7 controlling the coordinate detection executing section 126 comprises a recording medium 121 recording a program controlling the rejection choosing section 120 in addition to a program that the recording medium 10 has recorded.

Figure 12:
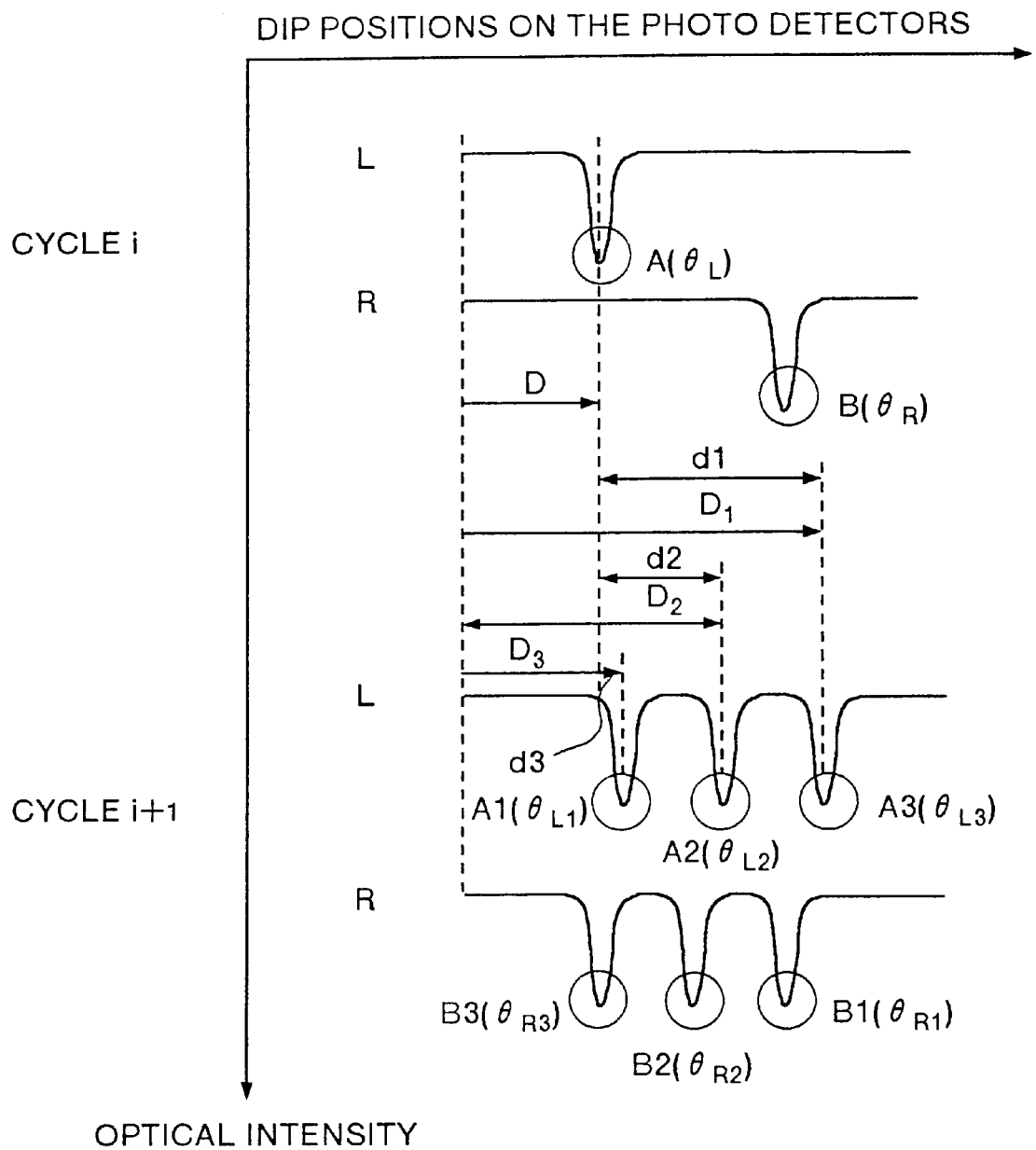
FIG. 12 is another view for explaining signals which are processed in the coordinate input apparatuses of the first embodiment and the second embodiment of the present invention.

Next, processing performed at the rejection choosing section 120 will be explained. FIG. 12 is a drawing showing the light intensity distribution signal (shown by L in the drawing) periodically detected at the photo detector 51a and the light intensity distribution signal (shown by R in the drawing) periodically detected at the photo detector 51b with respect to the detection cycles i, i+1. In the drawing, the vertical axis shows the optical intensity of the light intensity distribution signals, and the horizontal axis shows the dip positions on the photo detectors 51a, 51b.

In the detection of the cycle i shown in FIG. 12, the dip signal A expressing a dip in the light intensity distribution signal L inputted from the photo detector 51a to the dip position detecting section 93a is manifested. A dip signal B is manifested in the light intensity distribution signal R inputted from the photo detector 51b to the dip position detecting section 93b. The dip signal A and the dip signal B are inputted to the photo detectors 51a, 51b and are converted into the angles $\theta_L$, $\theta_R$ at the angle converting sections 94a, 94b, respectively, after the dip positions are detected at the dip position detecting sections 93a, 93b. At this time the angles $\theta_L$, $\theta_R$ are inputted to the coordinate arithmetic section 95 via the angle choosing section 125 as angle data ($\theta_L$, $\theta_R$), are converted into the coordinates inputted by the pointing means 15, and are outputted. The dip signal A and the angle data ($\theta_L$, $\theta_R$) based thereon are also outputted to and stored in the angle storing section 99.

At the detection of the cycle i+1, a dip signal A1, a dip signal A2, and a dip signal A3 are manifested in the light intensity distribution signal L inputted from the photo detector 51a to the dip position detecting section 93a. In the light intensity distribution signal R inputted from the photo detector 51b to the dip position detecting section 93b, a dip signal B1, a dip signal B2, and a dip signal B3 are manifested.

The dip signals A1, A2, A3 and the dip signals B1, B2, B3 are converted into the angles $\theta_{L1}$, $\theta_{L2}$, $\theta_{L3}$ and $\theta_{R1}$, $\theta_{R2}$, $\theta_{R3}$, respectively, at the angle converting sections 94a, 94b after the dip positions are detected at the dip position detecting sections 93b, 93b. The angles $\theta_{L1}$, $\theta_{L2}$, $\theta_{L3}$ and $\theta_{R1}$, $\theta_{R2}$, $\theta_{R3}$ are then inputted to the angle choosing section 125. The angle choosing section 125 takes a difference d1 between a dip position D of $\theta_L$ stored in the angle storing section 99 and a dip position D.sub.1 of the angle $\theta_{L1}$ (dip signal A1) detected at this time, takes a difference d2 between the dip position D of $\theta_L$ and a dip position D.sub.2 of the angle $\theta_{L2}$ (dip signal A2) detected at this time, and takes a difference d3 between the dip position D of $\theta_L$ and a dip position D.sub.3 of the angle $\theta_{L3}$ (dip signal A3) detected at this time so as to compare d1, d2, d3.

The most adjacent angle choosing section 97 adopts the dip signal A1 in which the difference with the dip position D is smaller and the angle $\theta_{L1}$ obtained by converting the dip signal A1 and outputs it to the coordinate arithmetic section 95 as well as the angle storing section 99. At this time the dip signal B1 and the angle $\theta_{R1}$ obtained by converting the dip signal B1 is adopted by similar processing and is outputted to the coordinate arithmetic section 95 as well as the angle storing section 99.

As shown in FIG. 12, the number of angles increased by the detection of the last time and the detection of this time is two for each angle detection section 4a, 4b, and angle data that angles which have not been adopted can form include four ways. In this situation, the angle choosing section 125 cannot determine correct combinations of the angle $\theta_{L2}$, $\theta_{L3}$ and the angle $\theta_{R2}$, $\theta_{R3}$ which have not been adopted.

With this reason, the non-most adjacent angle choosing section 98 of the angle choosing section 125 outputs the angle $\theta_{L2}$, $\theta_{L3}$ and the angle $\theta_{R2}$, $\theta_{R3}$ which have not been adopted to the rejection choosing section 120. The rejection choosing section 120 receives and erases the angle $\theta_{L2}$, $\theta_{L3}$ and the angle $\theta_{R2}$, $\theta_{R3}$. Thus, only the coordinates based on the angle data ($\theta_{L1}$, $\theta_{R1}$) formed by the angles chosen by the most adjacent angle choosing section 97 are detected.

Figure 13:
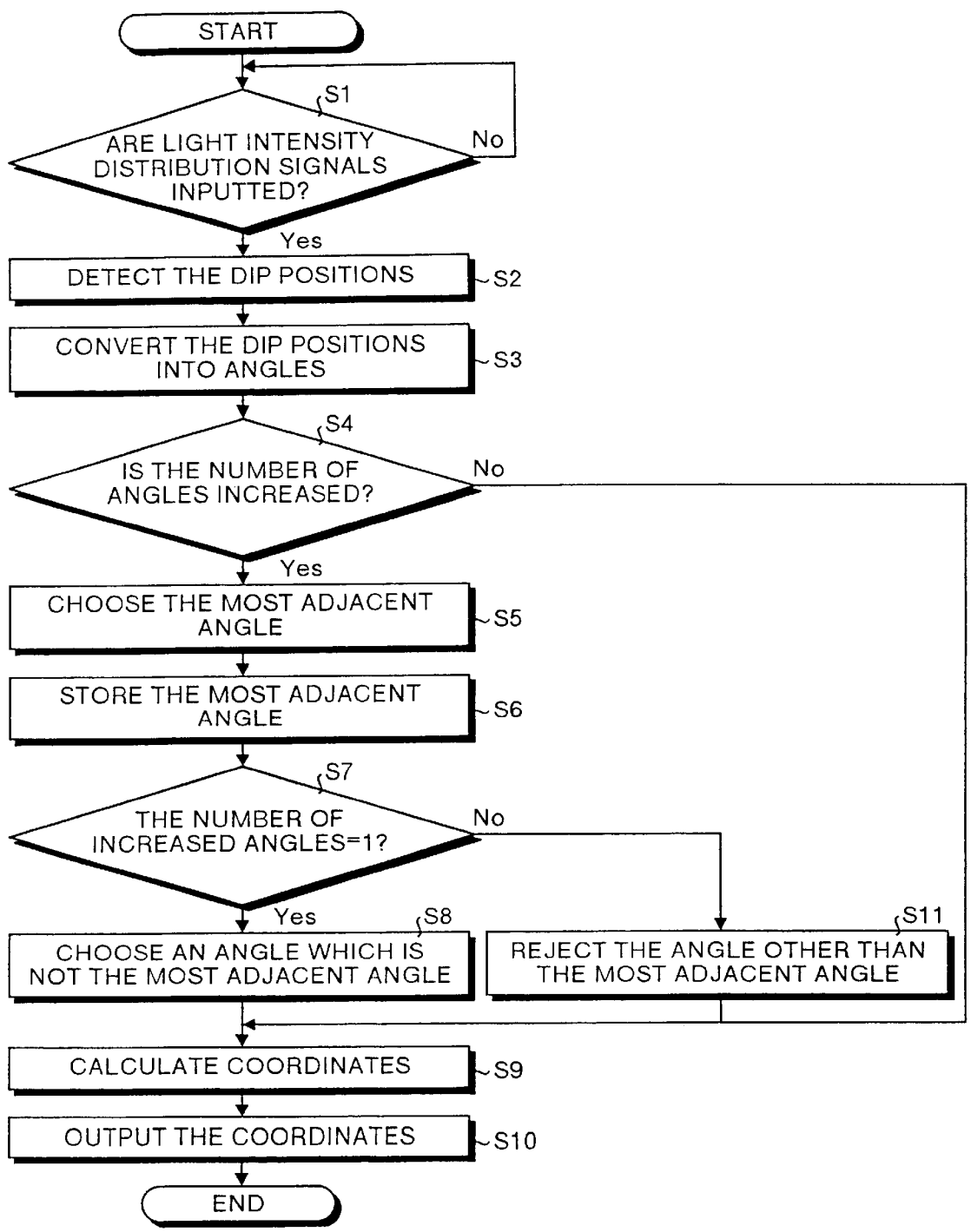
FIG. 13 is a flow chart explaining processes performed in the coordinate input apparatus of the first embodiment of the present invention.

FIG. 13 is a flow chart for explaining processes performed in the coordinate input apparatus of the first embodiment described above. This flow chart is stored in the recording medium 121 shown in FIG. 11 and is read by the central processing unit 7 so as to be performed.

In the flowchart of FIG. 13, after the start of processing, it is decided whether or not the light intensity distribution signals are inputted from the photo detectors 51a, 51b (S1). When there is no input of the light intensity distribution signals (S1: No), the state is on standby until inputs are received, and when the signals are inputted (S1: Yes), the dip positions are detected through the signals (S2) so as to convert the dip positions into angles (S3). The signals converted into angles are decided whether or not the number of angles converted is greater than that of angles converted at the last detection time (S4) at the angle choosing section 125.

When the number of angles has not been increased according to the decision of step S4 (S4: No), angle data are produced by combining converted angles so as to calculate coordinates (S9) and output them (S10). When the number of angles has been increased (S4: Yes), the most adjacent angle which is most adjacent to the angle stored in the angle storing section 99 is chosen (S5) and is substituted and is stored in the angle storing section 99 (S6). It is decided whether or not the number of increased angles is 1 (S7), and when the number of increased angles is 1 (S7: Yes), an angle which is not the most adjacent angle is chosen so as to produce angle data (S8), and coordinates are calculated from these angle data as well as the angle data produced from the most adjacent angles (S9) and are outputted (S10).

When the number of increased angles is not 1 (i.e., is more than 1) (S7: No), angles other than the most adjacent one are rejected (S11). In this situation, coordinates are calculated only from the angle data produced from the most adjacent angle (S9) and are outputted (S10) to finish all processing.

The coordinate input apparatus of the first embodiment described above, when being inputted a plurality of sets of coordinates, can discriminate these sets of coordinates for respective two pointing means so as to provide a coordinate input apparatus in which coordinates can be inputted by a plurality of operators. The coordinate input apparatus of the first embodiment, when inputted a plurality of sets of coordinates, can discriminate coordinates inputted by one pointing means from these sets of coordinates without being influenced by other pointing means.

Further, in the first embodiment, since the coordinate detection executing section is controlled by the program stored in the recording medium of the coordinate input apparatus read by the central processing unit, a general purpose personal computer or the like can be utilized as the central processing unit. Thus, according to the first embodiment, a coordinate input apparatus can be constituted relatively inexpensively, simply, and easily.

The present invention is not limited to the first embodiment described above. That is, in the first embodiment, differences between dip positions are calculated for comparing dip positions so as to take the one with the smallest difference as the most adjacent angle. However, for example, an appropriate threshold value may be set in advance, and an angle may be chosen among plural angles detected, concerning that one of differences between dip positions and the angle stored in the angle storing section 99 becomes below the threshold value.

Although the first embodiment is constituted as a coordinate input apparatus of the first example described above, it may be constituted as a coordinate input apparatus of the second example described above. In this case, processing of the light intensity distribution signals can be explained by differently calling the dip position "peak" and the dip signal "peak signal" in the explanation of processing of the light intensity distribution signals in the first embodiment.

Second Embodiment

Figure 14:
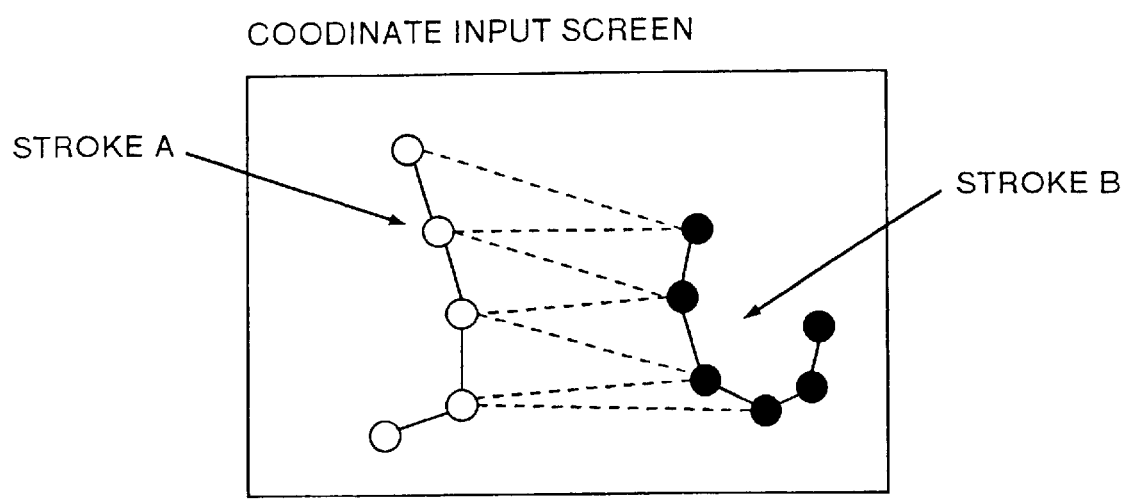
FIG. 14 is a view for explaining a function of the coordinate input apparatus of the second embodiment of the present invention.

FIG. 14 is a view schematically showing loci of coordinates when coordinates are simultaneously inputted by two pointing means. White circles shown in the drawing show coordinates inputted by a pointing means A, and black circles shown in the drawing show coordinates inputted by a pointing means B. Therefore, when these coordinates are outputted to an external appliance, such as a host computer, it is necessary that the outputting is executed so that the coordinates shown by the white circles draw a stroke A of the drawing and the coordinates shown by the black circles draw a stroke B of the drawing. However, there is a fear that the coordinates shown by the white circles and the coordinates shown by the black circles cannot be distinguished and are outputted as a drawing of the loci shown by broken lines in the drawing if coordinates inputted are outputted simply in the order of being inputted. The second embodiment is developed in order to prevent this situation.

Figure 15:
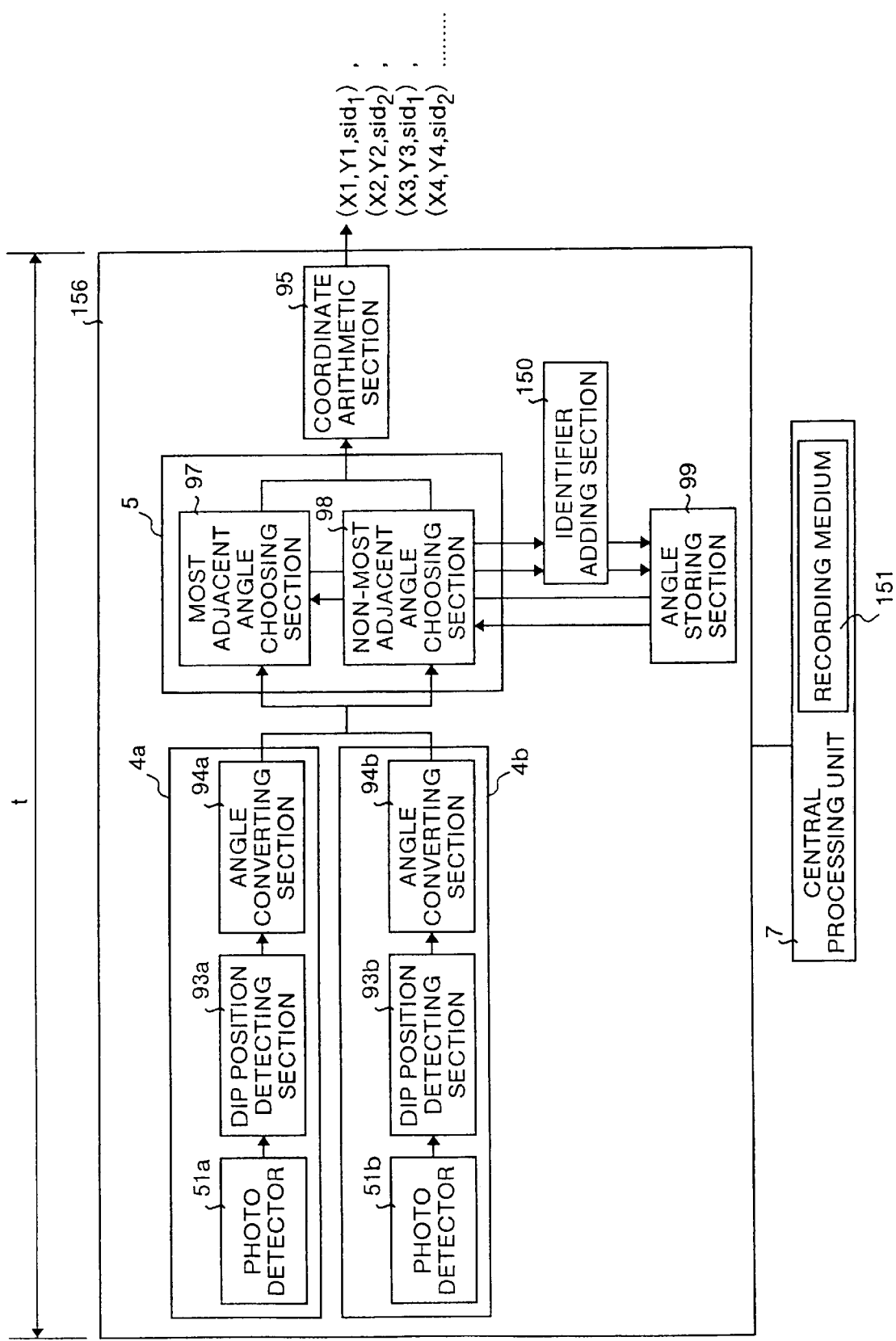
FIG. 15 is a block diagram for explaining the coordinate input apparatus of the second embodiment of the present invention.

FIG. 15 is a block diagram for explaining the second embodiment of the present invention. Similar reference numerals are attached to the constitution similar to that of FIG. 9 and FIG. 11 explained in the first embodiment among the constitution shown in FIG. 15 and the explanation thereof are partly omitted.

A coordinate input apparatus of the second embodiment shown in FIG. 15 comprises the panel 13 (FIG. 1) as the coordinate input face to which coordinates are inputted by the pointing means 15 (FIG. 1), such as a finger, and at least two angle detection sections 4a, 4b photographing the pointing means 15 and outputting it as the light intensity distribution signals. The coordinate input apparatus of the second embodiment comprises a coordinate detection executing section 156 executing the detection of coordinates inputted and the central processing unit 7 controlling the coordinate detection executing section 156.

The coordinate detection executing section 156 comprises the angle detection sections 4a, 4b, the angle choosing section 5, the coordinate arithmetic section 95, the angle storing section 99, and an identifier adding section 150 adding a first identifier to an angle chosen by the angle choosing section 5 and adding a second identifier to an angle to which the first identifier has not been added when the number of angles of this detection time periodically detected by the photo detectors 51a, 51b is one greater than that of angles of the last detection time for each photo detector 51a, 51b.

When the signals shown in FIG. 10 are inputted to the coordinate input apparatus shown in FIG. 15, since there is no peak in either of L, R in the light intensity distribution signals inputted in the cycle i−1, the dip position detecting sections 93a, 93b generate a signal "null" expressing "there is no dip" and input it to the angle converting sections 94a, 94b.

The angle converting sections 94a, 94b receive the signal null and generate a signal null similarly. Further, the angle choosing section 5 receiving this signal null generates a signal null and outputs it to the coordinate arithmetic section 95. The coordinate arithmetic section 95, when receiving the signal null, outputs a signal null, or outputs no signal. The signal null generated at the angle choosing section 5 is also inputted to and stored in the angle storing section 99.

Next, in the detection of the cycle i, a dip signal A and a dip signal B manifested in the light intensity distribution signals L, R are inputted to the photo detector 51a, 51b. The dip signal A and the dip signal B are converted into angles $\theta_L$, $\theta_R$ at the angle converting sections 94a, 94b, respectively, after the dip positions are detected at the dip position detecting sections 93a, 93b. The angles $\theta_L$, $\theta_R$ are outputted to the angle storing section 99 as angle data ($\theta_L$, $\theta_R$) and are substituted for the signal null stored previously.

At this time in the coordinate input apparatus of the second embodiment, sid (stroke ID)=1 is added to the angle data ($\theta_L$, $\theta_R$) by means of the identifier adding means 150. The angle data ($\theta_L$, $\theta_R$) are stored in the angle storing section 99 along with sid=1. The identifier adding means 150 adds sid=1 also to the angle data ($\theta_L$, $\theta_R$) inputted to the coordinate arithmetic section 95 via the angle choosing section 5. The angle data ($\theta_L$, $\theta_R$) are outputted to the coordinate arithmetic section 95 along with sid=1.

Next, at the detection of the cycle i+1, dip signals A1, A2 and dip signals B1, B2 manifested in the light intensity distribution signals L, R are inputted to the photo detectors 51a, 51b. The dip signals A1, A2 and the dip signals B1, B2 are converted into angles $\theta_{L1}$, $\theta_{L2}$, $\theta_{R1}$, $\theta_{R2}$, respectively, at the angle converting sections 94a, 94b after the dip positions are detected at the dip position detecting sections 93b, 93b. The angles $\theta_{L1}$, $\theta_{L2}$, $\theta_{R1}$, $\theta_{R2}$ are then inputted to the angle choosing section 5 to become angle data combined so as to correctly express the coordinates inputted.

That is, the angle choosing section 5 outputs the angles $\theta_{L1}$, $\theta_{L2}$, $\theta_{R1}$, $\theta_{R2}$ to the most adjacent angle choosing section 97 and the non-most adjacent angle choosing section 98. The most adjacent angle choosing section 97 and the non-most adjacent angle choosing section 98 read angle data ($\theta_L$, $\theta_R$) stored in the angle storing section 99 and compare the angle $\theta_L$ with the angle $\theta_{L1}$ and the angle $\theta_{L2}$. They also compare the angle $\theta_R$ with the angle $\theta_{R1}$ and the angle $\theta_{R2}$. These comparisons are performed similarly to the method explained through FIG. 10 earlier.

The most adjacent angle choosing section 97 adopts the dip signal A1 in which the difference with the dip position D is smaller and the angle $\theta_{L1}$ obtained by converting the dip signal A1 and outputs it to the coordinate arithmetic section 95 as well as the angle storing section 99. By similar processing the dip signal B1 and the angle $\theta_{R1}$ obtained by converting the dip signal B1 is adopted and is outputted to the coordinate arithmetic section 95 as well as the angle storing section 99.

The angle storing section 99 forms angle data ($\theta L1$, $\theta_{R1}$) from the angle $\theta_{L1}$ and the angle $\theta_{R1}$ and substitute them for the angle data ($\theta_L$, $\theta_R$). At this time in the coordinate input apparatus of the second embodiment, sid (stroke ID)=1 is added to the angle data ($\theta_L$, $\theta_R$) by means of the identifier adding means 150. The angle data ($\theta_L$, $\theta_R$) are stored in the angle storing section 99 along with sid=1. The identifier adding means 150 adds sid=1 also to the angle data ($\theta_L$, $\theta_R$) inputted to the coordinate arithmetic section 95 via the angle choosing section 5. The angle data ($\theta_L$, $\theta_R$) are outputted to the coordinate arithmetic section 95 along with sid=1.

The coordinate arithmetic section 95 performs calculation based on the angle $\theta_{L1}$ and the angle $\theta_{R1}$ inputted and detects the coordinates (x1, y1) inputted by the pointing means 15 represented by the angle data $\theta_{L1}$, $\theta_{R1}$). The coordinate arithmetic section 95 then outputs the coordinates (x1, y1) to a host computer or the like in the outside along with sid=1. In the above constitution, processing from the generation of the light intensity distribution signals at the photo detectors 51a, 51b until the coordinate arithmetic section 95 is outputted is repeatedly performed by the cycle t.

In the second embodiment explained above, the number of angles increased by the detection of the last time and the detection of this time is one for each angle detection section 4a, 4b, and angle data that the angle which has not been adopted can form include only one way. In this situation, the non-most adjacent angle choosing section 98 of the angle choosing section 5 forms the angle data ($\theta_{L2}$, $\theta_{R2}$), using the angle $\theta_{L2}$, the angle $\theta_{R2}$ which have not been adopted and outputs them to the coordinate arithmetic section 95. At this time in the coordinate input apparatus of the second embodiment, sid=2 is added to the angle data ($\theta_{L2}$, $\theta_{R2}$) by the identifier adding section 150. The coordinate arithmetic section 95 detects the coordinates regarding also the angle data ($\theta_{L2}$, $\theta_{R2}$) and outputs them as the coordinates (x2, y2) inputted by other pointing means along with sid=2.

The coordinates (x1, y1) outputted being added sid=1 and the coordinates (x2, y2) outputted being added sid=2 are inputted, for example, to a host computer. The host computer classifies the coordinates (x1, y1) and the coordinates (x2, y2) continuously inputted in accordance with the cycle of detection of the coordinate input apparatus side by each identifier and processes them so that coordinates with the same identifiers are displayed on a display device continuously in the order of being inputted. As a result, the coordinates with the identifier sid=1 draws the stroke A and the coordinates with the identifier sid=2 draws the stroke B as shown in FIG. 14.

The coordinate input apparatus of the first embodiment may further be constituted so as to be provided with a rejection choosing section 120 as an angle rejecting means rejecting an angle which has not been chosen by the angle choosing section 5 when the number of angles of this detection time periodically detected by the angle detection sections 4a, 4b is more than two greater than that of angles of the last detection time for either of the angle detection sections 4a, 4b.

Figure 16:
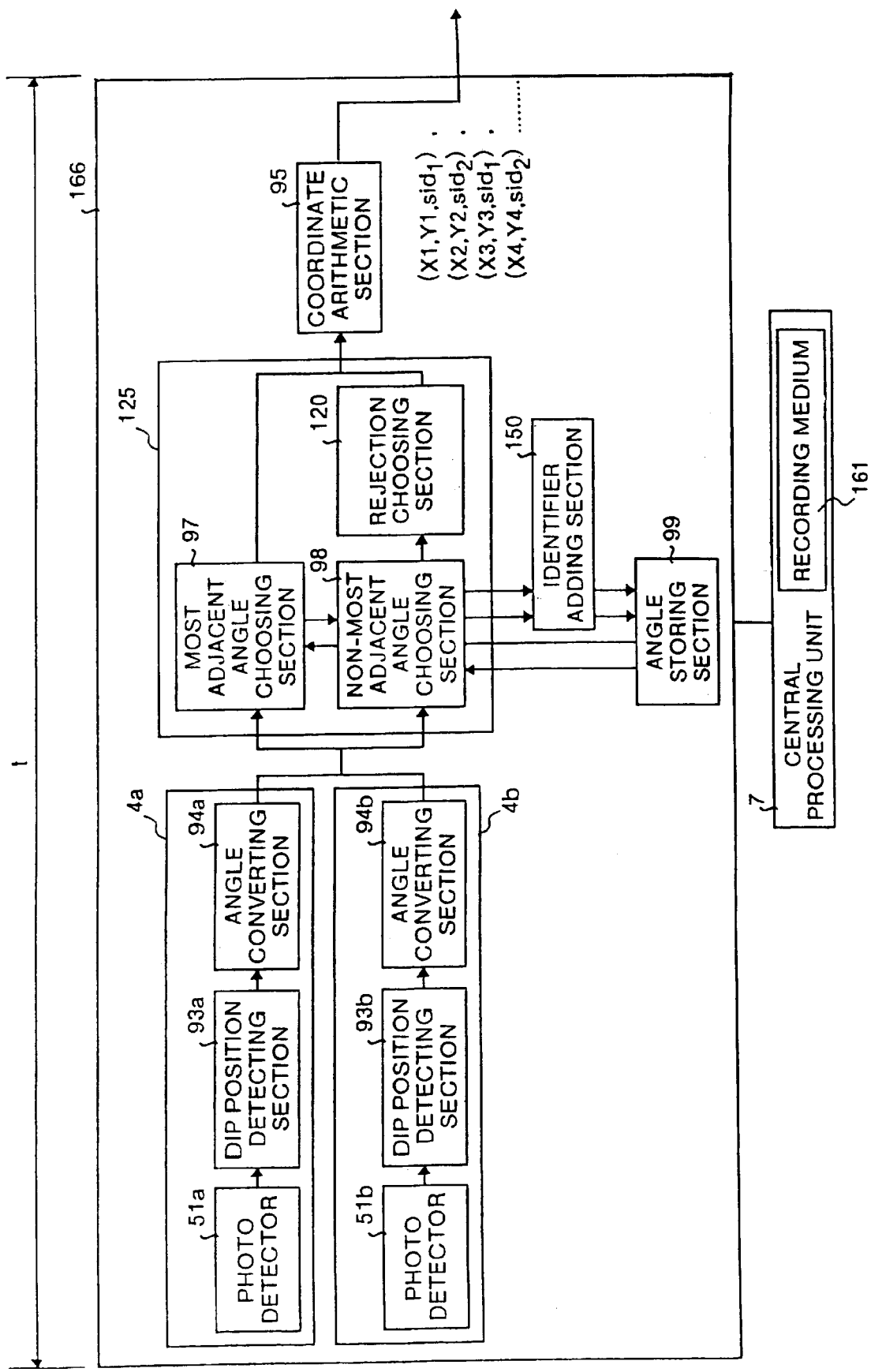
FIG. 16 is a block diagram for explaining another example of a coordinate input apparatus of the second embodiment of the present invention.
Figure 17:
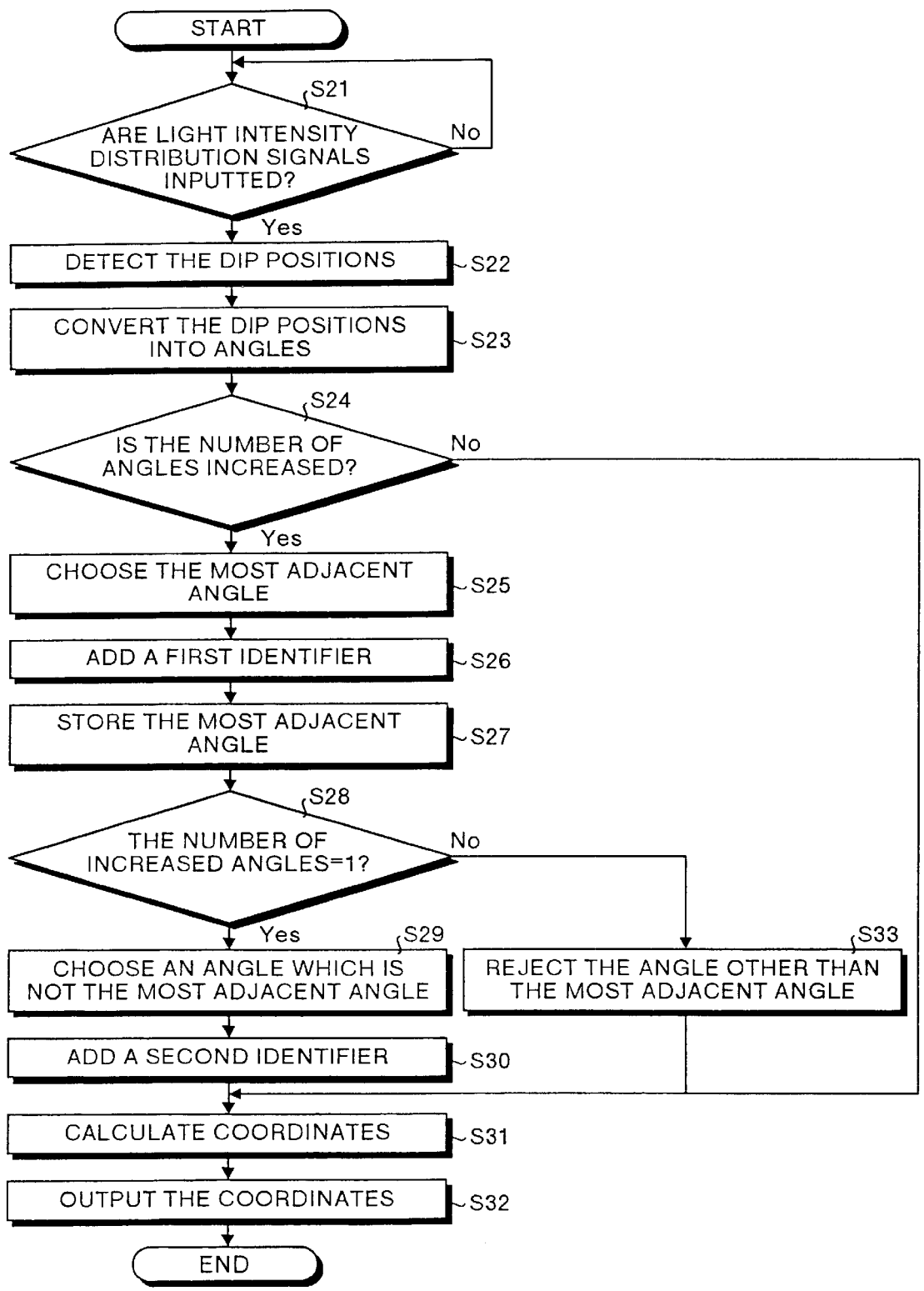
FIG. 17 is a flow chart explaining processes performed in the coordinate input apparatus of the second embodiment of the present invention.
Figure 18:
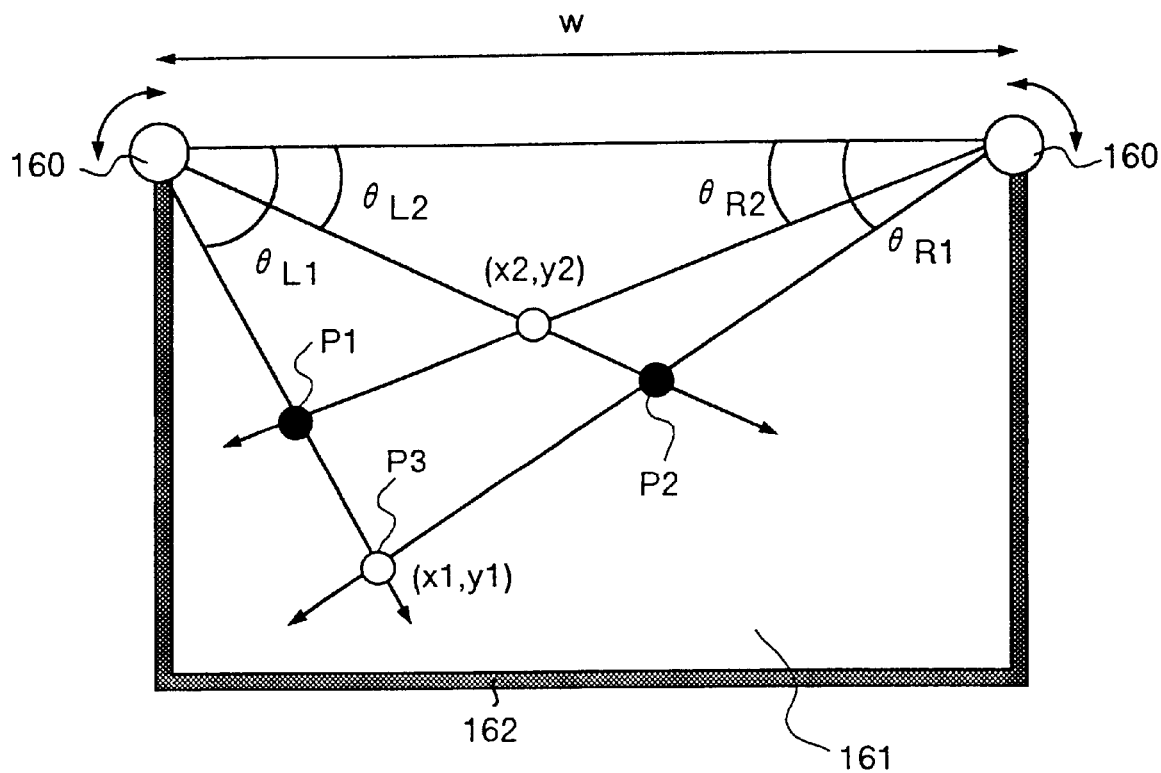
FIG. 18 is a view for explaining a conventional coordinate input apparatus.

FIG. 16 is a block diagram for explaining the second embodiment of the present invention provided with the rejection choosing section 120. FIG. 17 is a flow chart for explaining processes of coordinate detection performed in the constitution shown in FIG. 16. In the constitution shown in FIG. 17, the same reference numerals are put for the constitution similar to the constitution shown in FIG. 9, FIG. 11, FIG. 15 explained earlier and the explanation thereof are omitted.

A coordinate detection executing section 166 of the coordinate input apparatus shown in FIG. 16 comprises the most adjacent angle choosing section 97, the non-most adjacent angle choosing section 98, and the angle choosing section 125 having the rejection choosing section 120. The central processing unit 7 controlling the coordinate detection executing section 126 has a recording medium 161 storing a program controlling the rejection choosing section 120 in addition to the program that the recording medium 151 stores.

Next, processing performed in the rejection choosing section 120 will be explained. When the light intensity distribution signals shown in FIG. 12 are inputted to the coordinate detection executing section 126, the dip signal A and the dip signal B are inputted to the photo detectors 51a, 51b at the detection of the cycle i and are converted into the angles $\theta_L$, $\theta_R$ at the angle converting sections 94a, 94b, respectively, after the dip positions are detected at the dip position detecting sections 93a, 93b. At this time the angles $\theta_{L1}$, $\theta_R$ are inputted to the coordinate arithmetic section 95 via the angle choosing section 125 as angle data ($\theta_L$, $\theta_R$), are converted into the coordinates inputted by the pointing means 15, and are outputted. The dip signal A and the angle data of ($\theta_{L1}$, $\theta_R$) based thereon are also outputted to and stored in the angle storing section 99.

At the detection of the cycle i+1, the dip signals A1, A2, A3 and the dip signals B1, B2, B3 are converted into the angles $\theta_{L1}$, $\theta_{L2}$, $\theta_{L3}$ and $\theta_{R1}$, $\theta_{R2}$, $\theta_{R3}$ respectively, at the angle converting sections 94a, 94b after the dip positions are detected at the dip position detecting sections 93b, 93b. The angles $\theta_{L1}$, $\theta_{L2}$, $\theta_{L3}$ and $\theta_{R1}$, $\theta_{R2}$, $\theta_{R3}$ are then inputted to the angle choosing section 125. The angle choosing section 125 takes a difference d1 between a dip position D of $\theta_L$ stored in the angle storing section 99 and a dip position D.sub.1 of the angle $\theta_{L1}$ (dip signal A1) detected at this time, takes a difference d2 between the dip position D of $\theta_L$ and a dip position D.sub.2 of the angle $\theta_{L2}$ (dip signal A2) detected at this time, and takes a difference d3 between the dip position D of $\theta_L$ and a dip position D.sub.3 of the angle $\theta_{L3}$ (dip signal A3) detected at this time so as to compare d1, d2, d3.

The most adjacent angle choosing section 97 adopts the dip signal A1 in which the difference with the dip position D is smaller and the angle $\theta_{L1}$ obtained by converting the dip signal A1 and outputs it to the coordinate arithmetic section 95 as well as the angle storing section 99. At this time the dip signal B1 and the angle $\theta_{R1}$ obtained by converting the dip signal B1 is adopted by similar processing and is added the first identifier by the identifier adding section 150 to be outputted to the coordinate arithmetic section 95 as well as the angle storing section 99.

As shown in FIG. 12, the number of angles increased by the detection of the last time and the detection of this time is two for each angle detection section 4a, 4b, and angle data that angles which have not been adopted can form include four ways. In this situation, the angle choosing section 125 cannot determine correct combinations of the angle $\theta_{L2}$, $\theta_{L3}$ and the angle $\theta_{R2}$, $\theta_{R3}$ which have not been adopted.

With this reason, the non-most adjacent angle choosing section 98 of the angle choosing section 125 outputs the angle $\theta_{L2}$, $\theta_{L3}$ and the angle $\theta_{R2}$, $\theta_{R3}$ which have not been adopted to the rejection choosing section 120. The rejection choosing section 120 receives and erases the angle $\theta_{L2}$, $\theta_{L3}$ and the angle $\theta_{R2}$, $\theta_{R3}$. Thus, only the coordinates based on the angle data ($\theta_{L1}$, $\theta_{R1}$) formed by angles chosen by the most adjacent angle choosing section 97 are detected, and only the stroke A is displayed on the display device.

Next, processing performed in the coordinate input apparatus of the first embodiment described above will be explained using the flow chart of FIG. 17. This flow chart is stored in the recording medium 161 shown in FIG. 16 and is read by the central processing unit 7 so as to be performed.

In the flowchart of FIG. 17, after the start of processing, it is decided whether or not the light intensity distribution signals are inputted from the photo detectors 51a, 51b (S21). When there is no input of the light intensity distribution signals (S21: No), the state is on standby until inputs are received, and when the signals are inputted (S21: Yes), the dip positions are detected through the signals (S22) so as to convert the dip positions into angles (S23). The signals converted into angles are decided whether or not the number of angles converted is greater than that of angles converted at the last detection time (S24).

When the number of angles has not been increased according to the decision of step S24 (S24: No), angle data are produced by combining converted angles so as to calculate coordinates (S31) and output them (S32). When the number of angles has been increased (S24: Yes), the most adjacent angle which is most adjacent to the angle stored in the angle storing section 99 is chosen (S25), is added the first identifier, i.e., sid=1, (S26), and is substituted and stored in the angle storing section 99 (S27). The angle choosing section 125 then decides whether or not the number of increased angles is 1 (S28), and when the number of increased angles is 1 (S28: Yes), the angle which is not the most adjacent angle is chosen so as to produce angle data (S29) being added the second identifier (S30), and coordinates are calculated from these angle data as well as the angle data produced from the most adjacent angle (S31) and are outputted (S32).

When the number of increased angles is not 1 (i.e., is more than 1) (S28: No), angles other than the most adjacent one are rejected (S33). In this situation, coordinates are calculated only from angle data produced from the most adjacent angle (S31) and are outputted (S32) to finish all processing.

The second embodiment described above, when being inputted a plurality of sets of coordinates, can discriminate the respective strokes of the coordinates inputted by two pointing means from the coordinates so as to provide a coordinate input apparatus in which coordinates can be inputted by a plurality of operators. The second embodiment can provide a coordinate input apparatus in which a stroke of coordinates inputted by one pointing means can be discriminated among the coordinates without being influenced by other pointing means when inputted a plurality of sets of coordinates.

Further, in the second embodiment, since the coordinate detection executing section is controlled by the program stored in the recording medium of the coordinate input apparatus read by the central processing unit, a general purpose personal computer or the like can be utilized as the central processing unit. Thus, according to the second embodiment, a coordinate input apparatus can be constituted relatively inexpensively, simply, and easily.

The present invention is not limited to the second embodiment described above. That is, in the second embodiment, differences between dip positions are calculated for comparing dip positions so as to take the one with the smallest difference as the most adjacent angle. However, for example, an appropriate threshold value may be set in advance, and an angle may be chosen among plural angles detected, concerning that one of differences between dip positions and the angle stored in the angle storing section 99 becomes below the threshold value.

Although the second embodiment is constituted as a coordinate input apparatus of the first example described above, it may be constituted as a coordinate input apparatus of the second example described above. In this case, processing of the light intensity distribution signals can be explained by differently calling the dip position "peak" and the dip signal "peak signal" in the explanation of processing of the light intensity distribution signals in the second embodiment.

The present invention explained above can produce the following effects. That is, according to one aspect of this invention, a pointed point pointed by the pointing means through which the previous coordinates have been detected can be discriminated and the coordinates thereof can be detected. Thus, through the invention of one aspect a coordinate input apparatus can be provided wherein when plural sets of coordinates are inputted, the coordinate inputted by one pointing means can be discriminated among the coordinates.

According another aspect of this invention, the pointed point pointed by the pointing means through which the previous coordinates have been detected and the point pointed by another pointing means can be discriminated, and the coordinates can be detected. Thus, through the invention of another aspect a coordinate input apparatus can be provided wherein when plural sets of coordinates are inputted, the coordinates can be discriminated for respective two pointing means and thus coordinates can be inputted by plural operators.

According still another aspect of this invention, the pointed point pointed only by the pointing means through which the previous coordinates have been detected can be discriminated, and the coordinates can be detected. Thus, through the invention of still another aspect a coordinate input apparatus can be provided wherein when plural sets of coordinates are inputted, the coordinates inputted by one pointing means can be discriminated among the coordinates without being influenced by other pointing means.

According still another aspect of this invention, a stroke of pointed points pointed by the pointing means through which the previous coordinates have been detected can be discriminated, and the coordinates thereof can be detected. Thus, through the invention of still another aspect a coordinate input apparatus can be provided wherein when plural sets of coordinates are inputted, the stroke of the coordinates inputted by one pointing means can be discriminated among the coordinates.

According still another aspect of this invention, a stroke by the pointing means through which the previous coordinates have been detected and a stroke by an added pointing means can be discriminated, and the coordinates thereof can be detected. Thus, through the invention of still another aspect a coordinate input apparatus can be provided wherein when plural sets of coordinates are inputted, respective strokes of the coordinates inputted by two pointing means can be discriminated among the coordinates and thus coordinates can be inputted by plural operators.

According still another aspect of this invention, only the stroke by the pointing means through which the previous coordinates have been detected can be discriminated. Thus, through the invention of still another aspect a coordinate input apparatus can be provided wherein when plural sets of coordinates are inputted, the stroke of the coordinates inputted by one pointing means can be discriminated among the coordinates without being influenced by other pointing means.

According still another aspect of this invention, since the pointing means can be constituted relatively simply and the coordinate input face can be relatively large, a simple and easy coordinate input apparatus with a high operability can be constituted.

According still another aspect of this invention, since the pointing means can be constituted relatively simply and the coordinate input face can be relatively large, a simple and easy coordinate input apparatus with a high operability can be constituted.

According still another aspect of this invention, the pointed point pointed by the pointing means through which the previous coordinates have been detected can be discriminated, and the coordinates can be detected. Thus, through the invention of still another aspect a recording medium of a coordinate input apparatus can be provided wherein when plural sets of coordinates are inputted, the coordinates inputted by one pointing means can be discriminated among the coordinates. Further, a general purpose appliance can be applied for the central processing unit performing the processing in question.

According still another aspect of this invention, the pointed point pointed by the pointing means through which the previous coordinates have been detected and the point pointed by another pointing means can be discriminated, and the coordinates can be detected. Thus, through the invention of still another aspect a recording medium of a coordinate input apparatus can be provided wherein when plural sets of coordinates are inputted, the coordinates can be discriminated for respective two pointing means and thus coordinates can be inputted by plural operators. Further, a general purpose appliance can be applied for the central processing unit performing the processing in question.

According still another aspect of this invention, only the pointed point pointed by the pointing means through which the previous coordinates have been detected can be discriminated, and the coordinates can be detected. Thus, through the invention of still another aspect a recording medium of a coordinate input apparatus can be provided wherein when plural sets of coordinates are inputted, the coordinates inputted by one pointing means can be discriminated among the coordinates without being influenced by other pointing means. Further, a general purpose appliance can be applied for the central processing unit performing the processing in question.

According still another aspect of this invention, the stroke of the pointed points pointed by the pointing means through which the previous coordinates have been detected can be discriminated so as to detect the coordinates. Thus, through the invention of still another aspect a recording medium of a coordinate input apparatus can be provided wherein when plural sets of coordinates are inputted, the stroke of the coordinates inputted by one pointing means can be discriminated among the coordinates. Further, a general purpose appliance can be applied for the central processing unit performing the processing in question.

According still another aspect of this invention, the stroke by the pointing means through which the previous coordinates have been detected and the stroke by an added pointing means can be discriminated so as to detect the coordinates. Thus, through the invention of still another aspect a recording medium of a coordinate input apparatus can be provided wherein when plural sets of coordinates are inputted, respective strokes of the coordinates inputted by two pointing means can be discriminated among the coordinates and thus coordinates can be inputted by plural operators. Further, a general purpose appliance can be applied for the central processing unit performing the processing in question.

According still another aspect of this invention, only the stroke by the pointing means through which the previous coordinates have been detected can be discriminated. Thus, through the invention of still another aspect a recording medium of a coordinate input apparatus can be provided wherein when plural sets of coordinates are inputted, the stroke of the coordinates inputted by one pointing means can be discriminated among the coordinates without being influenced by other pointing means. Further, a general purpose appliance can be applied for the central processing unit performing the processing in question.

The present document incorporated by reference the entire contents of Japanese priority document, 11-258075 filed in Japan on Sep. 10, 1999.

Although the invention has been described with respect to a specific embodiment for a complete and clear disclosure, the appended claims are not to be thus limited but are to be construed as embodying all modifications and alternative constructions that may occur to one skilled in the art. which fairly fall within the basic teaching herein set forth.

What is claimed is:

1. A coordinate input apparatus comprising:
   a coordinate input face where coordinates are inputted by a pointing unit,
   a detection unit configured to periodically detect at least two angles formed by straight lines connecting a point corresponding to said pointing unit on said coordinate input face and reference points on said coordinate input face and a reference line on the coordinate input face,
   an angle storing unit configured to store angles detected by the detection unit during an immediately earlier cycle among angles periodically detected,
   an angle choosing unit configured to compare the angles detected during the immediately earlier cycle with angles detected during a present cycle, and to choose those angles determined during the present cycle that have a value most adjacent to a value of the angles detected during the immediately earlier cycle if a number of the angles detected during the present cycle is greater than a number of the angles detected during the immediately earlier cycle, and
   a coordinate detection unit configured to detect coordinates inputted by said pointing unit based on the angles chosen by said angle choosing unit.

2. The coordinate input apparatus according to claim 1, wherein said coordinate detection unit detects coordinates inputted by another pointing unit from angles which have not been chosen by the angle choosing unit when the number of angles detected during the present cycle is one greater than the number of angles of the immediately earlier cycle for said angle detection unit.

3. The coordinate input apparatus according to claim 1 further comprising an angle rejecting unit configured to reject angles which have not been chosen by the angle choosing unit when the number of angles detected during the present cycle by the angle detection unit is more than two greater than the number of angles detected during the immediately earlier cycle for said angle detection unit.

4. The coordinate input apparatus according to claim 1, wherein said angle detection unit comprises:
   a light emitting unit,
   a reflection unit recursively reflecting a light emitted by said light emitting unit,
   a light receiving unit provided at a position where a light reflected at the reflection unit can be received, and
   an optical unit configured to generate different positions of said light on the receiving unit in accordance with incident angles to the light receiving unit,
   wherein the angle detection unit identifies straight lines connecting the point corresponding to the pointing unit and the reference points on the coordinate input face through points where the light receiving unit has not received a reflected light so as to detect the angles formed by said straight lines and the reference line on the coordinate input face.

5. The coordinate input apparatus according to claim 1, wherein said angle detection unit comprises an image input unit configured to take an image approximately on a whole area of the coordinate input face, identify the straight lines connecting the point corresponding to the pointing unit and the reference points on the coordinate input face through an image of the pointing unit taken by the image input unit, and detect the angles formed by the straight lines and the reference line on the coordinate input face.

6. A coordinate input apparatus comprising:
   a coordinate input face where coordinates are inputted by a pointing unit,
   a detection unit configured to periodically detect at least two angles formed by straight lines connecting a point corresponding to said pointing unit on said coordinate input face and reference points on said coordinate input face and a reference line on the coordinate input face,
   an angle storing unit configured to store angles detected by the detection unit during an immediately earlier cycle among angles periodically detected,
   an angle choosing unit configured to compare the angles detected during the immediately earlier cycle with angles detected during a present cycle, and to choose those angles detected during the present cycle that have a value most adjacent to a value of the angles detected during the immediately earlier cycle if a number of the angles detected during the present cycle is greater than a number of the angles detected during the immediately earlier cycle,
   an identifier adding unit configured to add a first identifier to an angle chosen by the angle choosing unit, and
   a coordinate detection unit configured to detect coordinates of the point corresponding to said pointing unit based on the angle detected by said angle detection unit, wherein
   said coordinate detection unit detects the coordinates of said pointing unit which are continuous with coordinates which are based on the angles stored in the angle storing unit based on the angle to which said identifier adding unit has added the first identifier, and
   said angle storing unit stores the angle to which the identifier adding unit has added the first identifier.

7. The coordinate input apparatus according to claim 6, wherein
   said identifier adding unit adds a second identifier to an angle to which the first identifier has not been added when the number of angles detected during the present cycle by the angle detection unit is one greater than the number of angles detected during the immediate earlier cycle for said detection unit, and said coordinate detection unit detects coordinates inputted by an other pointing unit based on the angle to which the second identifier has been added by the identifier adding unit.

8. The coordinate input apparatus according to claim 6 further comprising an angle data rejection unit configured to reject angle data to which the first identifier has not been added by the identifier adding unit when the number of angles detected during the present cycle by the angle detection unit is more than two greater than the number of angles detected during the immediately earlier cycle for said detection unit.

9. The coordinate input apparatus according to claim 6, wherein said angle detection unit comprises:

a light emitting unit, a reflection unit recursively reflecting the light emitted by said light emitting unit, a light receiving unit provided at a position where a light reflected at the reflection unit can be received, and an optical unit configured to produce different positions of said light on the receiving unit in accordance with incident angles to the light receiving unit, wherein the angle detection unit identifies straight lines connecting the point corresponding to the pointing unit and the reference points on the coordinate input face through points where the light receiving unit has not received a reflected light so as to detect the angles formed by said straight lines and the reference line on the coordinate input face.

10. The coordinate input apparatus according to claim 6, wherein said angle detection unit comprises an image input unit configured to take an image approximately on a whole area of the coordinate input face, identify the straight lines connecting the point corresponding to the pointing unit and the reference points on the coordinate input face through an image of the pointing unit taken by the image input unit, and detect the angles formed by the straight lines and the reference line on the coordinate input face.

11. A recording medium of a coordinate input apparatus in which a program is stored readable by a central processing unit of the coordinate input apparatus comprising a coordinate input face where coordinates are inputted by a pointing unit and a detection unit configured to periodically detect at least two angles formed by straight lines connecting a point corresponding to said pointing unit on said coordinate input face and reference points on said coordinate input face and a reference line on the coordinate input face, wherein said recording medium stores a program comprising:

storing angles detected during an immediately earlier cycle among angles periodically detected, choosing angles detected during a present cycle that have a value most adjacent to a value of angles detected during the immediately earlier cycle if a number of the angles detected during the present cycle is greater than a number of angles detected during the immediately earlier cycle, and detecting coordinates inputted by said pointing unit based on angles chosen by said choosing angles.

12. The recording medium according to claim 11 further comprising detecting coordinates inputted by another pointing unit based on angle data which have not been chosen in the choosing angles when the number of angles detected during the present cycle by the angle detection unit is one greater than the number of angles detected during the immediately earlier cycle for said angle detection unit.

13. The recording medium according to claim 11 further comprising rejecting angles which have not been chosen in the choosing angles when the number of angles detected during the present cycle by the angle detection unit is more than two greater than the number of angles detected during the immediately earlier cycle for said angle detection unit.

14. A recording medium of a coordinate input apparatus in which a program is stored readable by a central processing unit of the coordinate input apparatus comprising a coordinate input face where coordinates are inputted by a pointing unit, a detection unit configured to periodically detect at least two angles formed by straight lines connecting a point corresponding to said pointing unit on said coordinate input face and reference points on said coordinate input face and a reference line on the coordinate input face, and an angle storing unit configured to store angles detected during an immediately earlier cycle among angles periodically detected by the angle detection unit, wherein said recording medium stores a program comprising:

choosing angles detected during the present cycle that have a value most adjacent to a value of the angles detected during the immediately earlier cycle and stored in said angle storing unit among angles detected during the present cycle when a number of angles detected during the present cycle is greater than a number of angles detected during the immediately earlier cycle, adding a first identifier to the angle chosen in the choosing angles, detecting the coordinates of said pointing unit which are continuous with coordinates based on the angles stored in the storing angles based on the angle to which the first identifier has been added in said adding the first identifier, and substituting and storing the angle to which the first identifier has been added in the adding the first identifier.

15. The recording medium according to claim 14 further comprising:

adding a second identifier to the angle to which the first identifier has not been added in the adding the first identifier; and detecting coordinates inputted by another pointing unit based on the angle to which the second identifier has been added in the adding the second identifier when the number of angles detected during the present cycle by the angle detection unit is one greater than the number of angles detected during the immediately earlier cycle for said angle detection unit.

16. The recording medium according to claim 14 further comprising rejecting angle data to which the first identifier has not been added in the adding the first identifier when the number of angles detected during the present cycle by the angle detection unit is more than two greater than the number of angles detected during the immediately earlier cycle for said angle detection unit.

* * * * *